(12) United States Patent
Hou et al.

(10) Patent No.: US 12,538,277 B2
(45) Date of Patent: Jan. 27, 2026

(54) METHOD FOR ENHANCING PHYSICAL DOWNLINK CONTROL CHANNEL, COMMUNICATION APPARATUS, AND SYSTEM

(71) Applicant: Huawei Technologies Co., Ltd., Shenzhen (CN)

(72) Inventors: Hailong Hou, Beijing (CN); Chaojun Li, Beijing (CN); Juan Zheng, Beijing (CN); Yongqiang Fei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 396 days.

(21) Appl. No.: 18/165,130

(22) Filed: Feb. 6, 2023

(65) Prior Publication Data

US 2023/0189225 A1 Jun. 15, 2023

Related U.S. Application Data

(63) Continuation of application No. PCT/CN2021/109370, filed on Jul. 29, 2021.

(30) Foreign Application Priority Data

Aug. 7, 2020 (CN) .......................... 202010799466.8

(51) Int. Cl.
*H04W 72/04* (2023.01)
*H04W 72/0446* (2023.01)
(Continued)

(52) U.S. Cl.
CPC ... *H04W 72/0446* (2013.01); *H04W 72/0453* (2013.01); *H04W 72/232* (2023.01)

(58) Field of Classification Search
CPC ......... H04W 72/0446; H04W 72/0453; H04W 72/232; H04W 4/70; H04W 72/23; H04L 5/0094; H04L 5/0053
See application file for complete search history.

(56) References Cited

U.S. PATENT DOCUMENTS 10,492,157 B2 11/2019 Nam et al.
11,483,826 B2 10/2022 Suzuki et al.
(Continued)

FOREIGN PATENT DOCUMENTS

CN 110168972 A 8/2019
CN 111131121 A 5/2020
(Continued)

OTHER PUBLICATIONS

"Remaining Issues on DL/UL Resource Allocation," Agenda item: 7.1.3.3.1, Source: Qualcomm Incorporated, Document for: Discussion/Decision, 3GPP TSG-RAN WG1 Meeting #93, R1-1807363, May 2-25, 2018, 14 pages.
(Continued)

*Primary Examiner* — Lan-Huong Truong
(74) *Attorney, Agent, or Firm* — Slater Matsil, LLP

(57) ABSTRACT

In an embodiment a method for enhancing a physical downlink control channel, the method includes obtaining, by a terminal device, control-resource set (CORESET) configuration information, wherein the CORESET configuration information is used for configuring a time-domain resource and a frequency-domain resource of a CORESET, wherein the time-domain resource comprises X time-domain symbols, wherein the X time-domain symbols are consecutive in time domain, wherein X is an integer greater than or equal to 1 and less than or equal to M, and wherein M is an integer greater than or equal to 4 and determining, by the terminal device, a physical downlink shared channel (PDSCH) time-domain resource configuration set based on the X time-domain symbols, wherein the PDSCH time-domain resource configuration set is for PDSCH time-domain resource allocation.

20 Claims, 7 Drawing Sheets

(51) Int. Cl.
    *H04W 72/0453*    (2023.01)
    *H04W 72/232*     (2023.01)

(56) References Cited

U.S. PATENT DOCUMENTS

| | | | |
|---|---|---|---|
| 2021/0360619 A1 | 11/2021 | Liu et al. | |
| 2022/0095304 A1* | 3/2022 | Muruganathan | H04B 7/024 |
| 2022/0240324 A1* | 7/2022 | Ko | H04W 72/23 |
| 2022/0295589 A1* | 9/2022 | Tsai | H04W 76/19 |
| 2023/0057016 A1* | 2/2023 | Alriksson | H04W 16/14 |

FOREIGN PATENT DOCUMENTS

| | | |
|---|---|---|
| WO | 2019074043 A1 | 4/2019 |
| WO | 2019214708 A1 | 11/2019 |
| WO | 2020063428 A1 | 4/2020 |

OTHER PUBLICATIONS

"New SID on support of reduced capability NR devices," Source: Ericsson, Document for: Information, Agenda Item: 9.1.1, 3GPP TSG RAN Meeting #86, RP-193238, Sitges, Spain, Dec. 9-12, 2019, 5 pages.

\* cited by examiner

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 5 |
| 1 | 1 | 24 | 2 | 6 |
| 2 | 1 | 24 | 2 | 7 |
| 3 | 1 | 24 | 2 | 8 |
| 4 | 1 | 24 | 3 | 5 |
| 5 | 1 | 24 | 3 | 6 |
| 6 | 1 | 24 | 3 | 7 |
| 7 | 1 | 24 | 3 | 8 |
| 8 | 1 | 48 | 1 | 18 |
| 9 | 1 | 48 | 1 | 20 |
| 10 | 1 | 48 | 2 | 18 |
| 11 | 1 | 48 | 2 | 20 |
| 12 | 1 | 48 | 3 | 18 |
| 13 | 1 | 48 | 3 | 20 |
| 14 | Reserved | | | |
| 15 | Reserved | | | |

Index: Index value
SS/PBCH block and CORESET multiplexing pattern: SS/PBCH block (SS/PBCH block, SSB) and CORESET multiplexing pattern
Number of RBs: Number of frequency-domain resources RBs
Number of Symbols: Number of time-domain symbols
Offset: Offset parameter value between the CORESET and the SSB
Reserved: Reserved field

FIG. 4

METHOD FOR ENHANCING PHYSICAL DOWNLINK CONTROL CHANNEL, COMMUNICATION APPARATUS, AND SYSTEM

CROSS-REFERENCE TO RELATED APPLICATIONS

This application is a continuation of International Application No. PCT/CN2021/109370, filed on Jul. 29, 2021, which claims priority to Chinese Patent Application No. 202010799466.8, filed on Aug. 7, 2020. The disclosures of the aforementioned applications are hereby incorporated by reference in their entireties.

TECHNICAL FIELD

This application relates to the technical field of communication, and in particular, to a method for enhancing a physical downlink control channel, a communication apparatus, and a system.

BACKGROUND

In a machine to machine (M2M) scenario, terminal costs may be reduced by reducing a terminal bandwidth (including a radio frequency bandwidth and a baseband bandwidth) and reducing receive lines of a terminal device. However, after the terminal bandwidth (including the radio frequency bandwidth and the baseband bandwidth) is reduced, the terminal device cannot receive or send a signal on a frequency band that exceeds bandwidth capability. Therefore, a physical downlink control channel (PDCCH) cannot support a higher aggregation level (AL), and performance of the PDCCH deteriorates. After the number of receive antennas of the terminal device is reduced, a receive diversity gain of the PDCCH is lost, and then the performance of the PDCCH deteriorates.

To improve the performance of the PDCCH, more control channel elements (CCEs) may be provided by increasing the number of consecutive time-domain symbols in a control-resource set (CORESET). In this way, the PDCCH can support a higher AL, to improve the performance of the PDCCH. However, when the number of consecutive time-domain symbols is greater than 3, the CORESET collides with a symbol of a first demodulation reference signal (DMRS) in a mapping type A in a physical downlink shared channel (PDSCH), that is, when the PDCCH and the physical downlink shared channel (PDSCH) are scheduled in a same subframe, a PDSCH mapping type A resource configuration manner cannot be supported. As a result, the terminal device can schedule and transmit a time-domain resource to a system information block 1 (SIB1) only by using a mapping type B, which affects flexibility of time domain allocation of the PDSCH carrying the SIB1, and affects transmission performance of the SIB1.

It can be learned that how to provide a method for enhancing a PDCCH to ensure flexibility of time-domain resource allocation of a PDSCH while enhancing transmission performance of the PDCCH is an urgent problem to be resolved.

SUMMARY

Embodiments provide a method for enhancing a physical downlink control channel, a communication apparatus, and a system, to improve transmission performance of a physical downlink control channel by increasing the number of consecutive time-domain symbols of a control-resource set, and ensure flexibility of time domain allocation of a physical downlink shared channel.

According to a first embodiment, this application provides a method for enhancing a physical downlink control channel. The method may be applied to a terminal device, or may be applied to a component (a chip, a processor, or the like) of the terminal device. For example, the method is applied to the terminal device. The method includes: obtaining, by a terminal device, control-resource set CORESET configuration information, where the CORESET configuration information is used for configuring a time-domain resource and a frequency-domain resource of a CORESET, the time-domain resource includes X time-domain symbols, and the X time-domain symbols are consecutive in time domain; and X is an integer greater than or equal to 1 and less than or equal to M, and M is an integer greater than or equal to 4; and determining, by the terminal device, a physical downlink shared channel PDSCH time-domain resource configuration set based on the X time-domain symbols, where the PDSCH time-domain resource configuration set is for PDSCH time-domain resource allocation.

Based on the method described in the first embodiment, the terminal device may provide more control channel elements by increasing the number of time-domain symbols of the CORESET, to enhance transmission performance of the physical downlink control channel. In addition, the terminal device may determine the time-domain resource configuration information of the physical downlink shared channel based on the number of time-domain symbols of the CORESET, to ensure flexibility of time-domain resource allocation of the physical downlink shared channel.

In a possible implementation, the physical downlink shared channel PDSCH time-domain resource configuration set is any one of a PDSCH time-domain resource configuration table, a PDSCH time-domain resource matrix, or a combination of PDSCH time-domain resource allocation information elements. By implementing this possible implementation, the terminal device may determine the PDSCH time-domain resource configuration information from a specific PDSCH time-domain resource configuration set.

In a possible implementation, when the X time-domain symbols are less than or equal to 3 in number, the terminal device determines a first PDSCH time-domain resource configuration set, where the first PDSCH time-domain resource configuration set includes a mapping type of a PDSCH time-domain resource, and the mapping type includes a mapping type A and a mapping type B. By implementing this possible implementation, when the number of time-domain symbols included in the CORESET is less than or equal to 3, the terminal device may determine specific time-domain resource configuration information of the PDSCH time-domain resource from the first PDSCH time-domain resource configuration set.

In a possible implementation, when the X time-domain symbols are greater than 3 in number, the terminal device determines a second PDSCH time-domain resource configuration set, where the second PDSCH time-domain resource configuration set includes at least one group of PDSCH time-domain resource allocation information, the PDSCH time-domain resource allocation information includes a mapping type of a PDSCH time-domain resource, a PDSCH time-domain start symbol, and a PDSCH time-domain length, and each group of PDSCH time-domain resource configuration information in the at least one group of PDSCH time-domain resource allocation information corresponds to row indication information. By implementing this possible implementation, when the number of time-domain symbols included in the CORESET is greater than 3, the terminal device may determine specific time-domain resource configuration information of the PDSCH time-domain resource from the second PDSCH time-domain resource configuration set.

In a possible implementation, the terminal device determines target PDSCH time-domain resource allocation information from the second PDSCH time-domain resource configuration set based on the row indication information. By implementing this possible implementation, after the terminal device determines the second time-domain resource configuration set based on the number of time-domain symbols of the CORESET, specifically, the terminal device may further determine specific PDSCH time-domain resource configuration information based on the row indication information.

In a possible implementation, the terminal device determines the target PDSCH time-domain resource allocation information from the second PDSCH time-domain resource configuration set based on the row indication information and position information of a demodulation reference signal DMRS of the PDSCH time-domain resource mapping type A. The target PDSCH time-domain resource allocation information includes time-domain resource configuration information such as a mapping type of a PDSCH time-domain resource, a PDSCH time-domain start symbol, a PDSCH time-domain length, and the like. By implementing this possible implementation, the terminal device may jointly indicate specific PDSCH time-domain resource configuration information based on the row indication information and the position information of the demodulation reference signal DMRS of the PDSCH time-domain resource mapping type A, so that more PDSCH time-domain resource configuration information can be supported.

In a possible implementation, the terminal device determines the target PDSCH time-domain resource configuration information from the second PDSCH time-domain resource configuration set based on a time-domain resource allocation indication field in downlink control information DCI carried on the PDCCH and/or position information of a DMRS of a PDSCH time-domain resource classification mapping type A sent by a network device. A mapping relationship exists between an indication status of the time-domain resource allocation indication field in the DCI and the row indication information. By implementing this possible implementation, the terminal device may further jointly indicate specific PDSCH time-domain resource configuration information based on the indication status of the time-domain resource allocation indication field in the DCI that has the mapping relationship with the row indication information and the position information of the demodulation reference signal DMRS of the PDSCH time-domain resource mapping type A.

In a possible implementation, the CORESET configuration information is CORESET0 configuration information. In this case, the terminal device determines a frequency-domain resource of a downlink initial bandwidth part BWP based on a frequency-domain resource of the CORESET0. By implementing this possible implementation, the terminal device may determine a specific frequency-domain resource by using specific CORESET configuration information, so that the terminal device subsequently communicates with the network device.

In a possible implementation, the terminal device receives a master information block MIB from the network device by using a physical broadcast channel PBCH, where the MIB includes configuration information of a system information block 1, and the configuration information of the system information block 1 indicates the control-resource set CORESET configuration information; or the terminal device receives an MIB from the network device by using a physical broadcast channel PBCH, where an idle bit in the MIB indicates the control-resource set CORESET configuration information; or the terminal device receives a newly added timing bit from the network device by using a PBCH, where the newly added timing bit indicates the control-resource set CORESET configuration information; or the terminal device receives an MIB and a newly added timing bit from the network device by using a PBCH, where the MIB and the newly added timing bit indicate the control-resource set CORESET configuration information; or the terminal device receives indication information from the network device, where the indication information indicates the control-resource set CORESET configuration information, and the indication information includes one or more of a system information block 1, radio resource control signaling, media access signaling, and downlink control information. By implementing this possible implementation, the terminal device may obtain the CORESET configuration information from different information blocks based on different application scenarios. This weakens a limitation on a scenario in which the terminal device obtains the CORESET configuration information, and expands an application scenario.

In a possible implementation, the second PDSCH time-domain resource configuration set is predefined or pre-configured; or the terminal device receives indication information from the network device, where the indication information indicates configuration information of the second PDSCH time-domain resource configuration set, and the indication information includes one or more of a system information block 1, radio resource control signaling, media access signaling, and downlink control information. By implementing this possible implementation, the terminal device may obtain the configuration information of the second PDSCH time-domain resource configuration set from different information blocks based on different application scenarios. This weakens a limitation on a scenario in which the terminal device obtains the configuration information of the second PDSCH time-domain resource configuration set, and expands an application scenario.

According to a second embodiment, this application provides a method for enhancing a physical downlink control channel. The method may be applied to a network device, or may be applied to a component (such as a chip, a processor, or the like) of the network device. For example, the method is applied to the network device. The method includes: sending, by a network device, control-resource set CORESET configuration information to a terminal device, where the CORESET configuration information is used for configuring a time-domain resource and a frequency-domain resource of a CORESET, the time-domain resource includes X time-domain symbols, the X time-domain symbols are consecutive in time domain, X is an integer greater than or equal to 1 and less than or equal to M, and M is an integer greater than or equal to 4; and communicating, by the network device, with the terminal device by using a resource configured in the CORESET configuration information.

Based on the method described in the second embodiment, the network device may send the CORESET configuration information to the terminal device, so that the terminal device can increase the number of time-domain symbols of the CORESET based on the CORESET configuration information to provide more control channel elements, to enhance transmission performance of a physical downlink control channel.

In a feasible implementation, the network device sends a master information block MIB to the terminal device by using a physical broadcast channel PBCH, where the MIB includes configuration information of a system information block 1, and the configuration information of the system information block 1 indicates the control-resource set CORESET configuration information; or the network device sends an MIB to the terminal device by using a physical broadcast channel PBCH, where an idle bit in the MIB indicates the control-resource set CORESET configuration information; or the network device sends a newly added timing bit to the terminal device by using a PBCH, where the newly added timing bit indicates the control-resource set CORESET configuration information; or the network device sends an MIB and a newly added timing bit to the terminal device by using a PBCH, where the MIB and the newly added timing bit indicate the control-resource set CORESET configuration information; or the network device sends indication information to the terminal device, where the indication information indicates the control-resource set CORESET configuration information, and the indication information includes one or more of a system information block 1, radio resource control signaling, media access signaling, and downlink control information. By implementing this possible implementation, the network device may select different information blocks as carriers of the CORESET configuration information based on different application scenarios. This weakens a limitation on a scenario in which the network device sends the CORESET configuration information, and expands an application scenario.

In a possible implementation, a second PDSCH time-domain resource configuration set is predefined or preconfigured; or the network device sends indication information to the network device, where the indication information indicates configuration information of the second PDSCH time-domain resource configuration set, and the indication information includes one or more of a system information block 1, radio resource control signaling, media access signaling, and downlink control information. By implementing this possible implementation, the terminal device may obtain the configuration information of the second PDSCH time-domain resource configuration set from different information blocks based on different application scenarios. This weakens a limitation on a scenario in which the terminal device obtains the configuration information of the second PDSCH time-domain resource configuration set, and expands an application scenario.

According to a third embodiment, this application provides a communication apparatus. The apparatus may be an apparatus in a terminal device, or an apparatus that can be used together with a terminal device. The communication apparatus may further be a chip system. The communication apparatus may perform the method according to the first embodiment. A function of the communication apparatus may be implemented by hardware, or may be implemented by hardware by executing corresponding software. The hardware or software includes one or more units corresponding to the foregoing function. The unit may be software and/or hardware. For operations performed by the communication apparatus and beneficial effects thereof, refer to the method in the first embodiment and the beneficial effects thereof. Repeated parts are not described again.

According to a fourth embodiment, this application provides a communication apparatus. The apparatus may be an apparatus in a network device, or an apparatus that can be used together with a network device. The communication apparatus may further be a chip system. The communication apparatus may perform the method according to the second embodiment. A function of the communication apparatus may be implemented by hardware, or may be implemented by hardware by executing corresponding software. The hardware or software includes one or more units corresponding to the foregoing function. The unit may be software and/or hardware. For operations performed by the communication apparatus and beneficial effects thereof, refer to the method in the second embodiment and the beneficial effects thereof. Repeated parts are not described again.

According to a fifth embodiment, a communication apparatus is provided. The communication apparatus may be the terminal device in the foregoing method embodiments or a chip disposed in the terminal device. The communication apparatus includes a communication interface and a processor, and optionally, further includes a memory. The memory is configured to store a computer program or an instruction. The processor is coupled to the memory and the communication interface. When the processor executes the computer program or the instruction, the communication apparatus is enabled to perform the method performed by the terminal device in the foregoing method embodiment.

According to a sixth embodiment, a communication apparatus is provided. The communication apparatus may be the network device or the chip disposed in the network device in the foregoing method embodiments. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the method performed by the network device in the foregoing method embodiment.

According to a seventh embodiment, this application provides a computer-readable storage medium, where the computer-readable storage medium is configured to store computer-executable instructions, and when the computer-executable instructions are executed, the method performed by the terminal device in the method described in the first embodiment is implemented.

According to an eighth embodiment, this application provides a computer-readable storage medium, where the computer-readable storage medium is configured to store computer-executable instructions, and when the computer-executable instructions are executed, the method performed by the terminal device in the method described in the second embodiment is implemented.

According to a ninth embodiment, this application provides a computer program product including a computer program, and when the computer program is executed, the method performed by the terminal device in the method described in the first embodiment is implemented.

According to a tenth embodiment, this application provides a computer program product including a computer program, and when the computer program is executed, the method performed by the network device in the method described in the second embodiment is implemented.

According to an eleventh embodiment, this application provides a communication system. The communication system includes the communication apparatus described in the third embodiment or the fifth embodiment and the communication apparatus described in the fourth embodiment or the sixth embodiment.

BRIEF DESCRIPTION OF THE DRAWINGS

FIG. 4 is a schematic diagram of a method for determining CORESET configuration information according to an embodiment of this application;

DETAILED DESCRIPTION OF ILLUSTRATIVE EMBODIMENTS

To make objectives, technical solutions, and advantages of this application clearer, the following further describes this application in detail with reference to the accompanying drawings.

In the specification, claims, and accompanying drawings of this application, the terms "first", "second", and so on are intended to distinguish between different objects but do not indicate a particular order. In addition, terms "include", "have", and any other variant thereof are intended to cover non-exclusive inclusion. For example, a process, a method, a system, a product, or a device that includes a series of operations or units is not limited to the listed operations or units, but optionally further includes an unlisted operation or unit, or optionally further includes another inherent operation or unit of the process, the method, the product, or the device.

Embodiment mentioned in the specification means that particular features, structures, or characteristics described with reference to the embodiment may be included in at least one embodiment of this application. The phrase shown in various positions in the specification may not necessarily refer to a same embodiment, and is not an independent or optional embodiment exclusive from another embodiment. It is explicitly and implicitly understood by a person skilled in the art that embodiments described in the specification may be combined with another embodiment.

In this application, "at least one (item)" means one or more, "a plurality of" means two or more, "at least two (item)" means two or three or more, and "and/or" is used to describe a correspondence between corresponding objects and represents that three relationships may exist. For example, "A and/or B" may represent: Only A exists, only B exists, and both A and B exist, where A and B may be singular or plural. The character "/" generally indicates an "or" relationship between the corresponding objects. "At least one of the following items (pieces)" or a similar expression thereof refers to any combination of these items, including any combination of singular items (pieces) or plural items (pieces). For example, at least one of a, b, or c may represent a, b, c, "a and b", "a and c", "b and c", or "a and b and c", where a, b, and c may be singular or plural.

To better understand the solutions provided in this application, the following first describes a system architecture in this application.

The method provided in the embodiments of this application may be applied to various communication systems, for example, an Internet of Things (IoT) system, a Narrowband Internet of Things (NB-IoT) system, a Long Term Evolution (LTE) system, a 5th generation (5G) communication system, an LTE and 5G hybrid architecture, a 5G New Radio (NR) system, and a new communication system emerging in future communication development.

Figure 1:
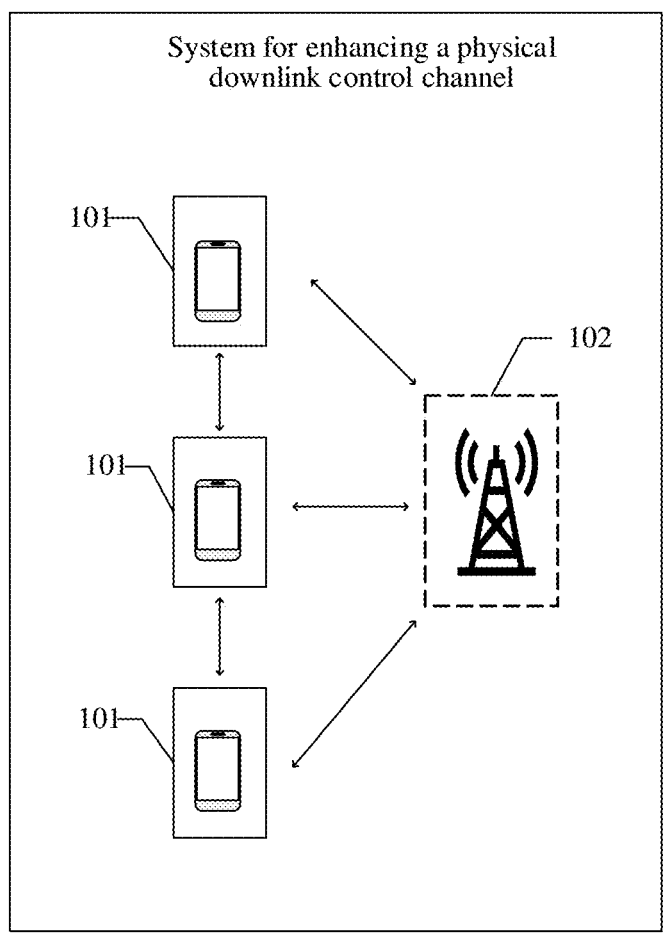
FIG. 1 is a schematic diagram of an architecture of a system for enhancing a physical downlink control channel according to an embodiment of this application.

FIG. 1 is a schematic diagram of an architecture of a system for enhancing a physical downlink control channel according to an embodiment of this application. The architecture of the system is a massive machine type communication (mMTC) communication system architecture. As shown in FIG. 1, the architecture of the system includes terminal devices 101 and a network device 102. The terminal devices 101 may communicate with each other, and the terminal devices 101 and the network device 102 may communicate with each other. It should be learned that the number of terminal devices 101 is merely an example, and the number of terminal devices 101 is not specifically limited in this embodiment of this application. The terminal device 101 may be a reduced capability (REDCAP) terminal device, or may be a normal (referred to as NR legacy below) terminal device whose channel bandwidth is not reduced.

In this embodiment of this application, after the terminal device 101 synchronizes time and frequency with the network device 102, the network device 102 sends CORESET configuration information to the terminal device 101. The terminal device 101 receives the CORESET configuration information, and determines a time-domain resource and a frequency-domain resource of a CORESET based on the CORESET configuration information. The time-domain resource includes X time-domain symbols, the X time-domain symbols are consecutive in time domain, X is an integer greater than or equal to 1 and less than or equal to M, and M is an integer greater than or equal to 4. Further, the terminal device may determine a PDSCH time-domain resource configuration set based on the X time-domain symbols, where the time-domain resource configuration set is for PDSCH time-domain resource allocation. In this manner, the terminal device may provide more control channel elements by increasing the number of time-domain symbols of the CORESET, thereby enhancing transmission performance of the physical downlink control channel. In addition, the terminal device may determine the PDSCH time-domain resource configuration information based on the number of time-domain symbols of the CORESET, thereby ensuring flexibility of the time-domain resource allocation of the PDSCH.

The terminal device in embodiments of this application is an entity that is on a user side and that is configured to receive or transmit a signal. The terminal device may be a device that provides a user with voice and/or data connectivity, for example, a handheld device or an in-vehicle device with a wireless connection function. The terminal device may alternatively be another processing device connected to a wireless modem. The terminal device may communicate with a radio access network (RAN). The terminal device may also be referred to as a wireless terminal device, a subscriber unit, a subscriber station, a mobile station, a mobile, a remote station, an access point, a remote terminal, an access terminal, a user terminal, a user agent, a user device, a user equipment (UE), or the like. The terminal device may be a mobile terminal device, for example, a mobile phone (or referred to as a "cellular" phone), and a computer that has a mobile terminal device. For example, the terminal device may be a portable, pocket-size, handheld, computer-integrated or in-vehicle mobile apparatus, which exchanges voice and/or data with the radio access network. For example, the terminal device may also be a device such as a personal communication service (PCS) phone, a cordless phone, a session initiation protocol (SIP) phone, a wireless local loop (WLL) station, or a personal digital assistant (PDA). Common terminal devices include, for example, a car, an unmanned aerial vehicle, a robotic arm, a mobile phone, a tablet computer, a notebook computer, a palmtop computer, a mobile Internet device (MID), and a wearable device such as a smartwatch, a smart band, or a pedometer. However, this is not limited in this embodiment of this application.

The network device (or the access network device) in the embodiments of this application is an entity configured to transmit or receive a signal on a network side, and may be configured to mutually convert a received over-the-air frame and a network protocol (IP) packet, and serve as a router between the terminal device and a remaining part of the access network. The remaining part of the access network may include an IP network or the like. The access network device may further coordinate attribute management of an air interface. For example, the access network device may be an evolved NodeB (evolutional Node B, eNB or e-NodeB) in LTE, or may be a new radio controller (NR controller), or may be an ng-eNB, or may be a gNode B (gNB) in a 5G system, or may be a centralized unit, or may be a new radio base station, or may be a remote radio module, or may be a micro base station, or may be a relay, or may be a distributed unit, or may be a transmission reception point (TRP), a transmission point (TP), or any other radio access device. However, this is not limited in this embodiment of this application.

To better understand the solutions provided in this application, the following describes related terms in embodiments of this application.

Physical downlink control channel (PDCCH): The PDCCH is transmitted in the form of a control channel element (CCE), that is, the CCE is a minimum resource unit for PDCCH transmission. One PDCCH may include one or more CCEs, and the number of CCEs included in one PDCCH is determined by an aggregation level (AL). For details, refer to Table 1.

TABLE 1

| Aggregation level | Number of CCEs |
| --- | --- |
| 1 | 1 |
| 2 | 2 |
| 4 | 4 |

TABLE 1-continued

| Aggregation level | Number of CCEs |
| --- | --- |
| 8 | 8 |
| 16 | 16 |

One piece of downlink control information (DCI) may be transmitted on one CCE. If the terminal device is far away, a signal is poor, and the PDCCH cannot be demodulated, a manner of increasing an aggregation level needs to be used to improve PDCCH receiving performance, so that the remote terminal device can also successfully demodulate the PDCCH. One CCE includes six resource element groups (REGs). One REG occupies one orthogonal frequency division multiplexing (OFDM) symbol (referred to as a time-domain symbol below) in time domain, and occupies one resource block (RB) in frequency domain. One CCE includes 72 resource elements (REs), and one RE carries two bits (bits). In addition to three REs that are in one REG and that are occupied by a PDCCH demodulation reference signal (DMRS), one CCE can carry 108 bits.

Figure 2:
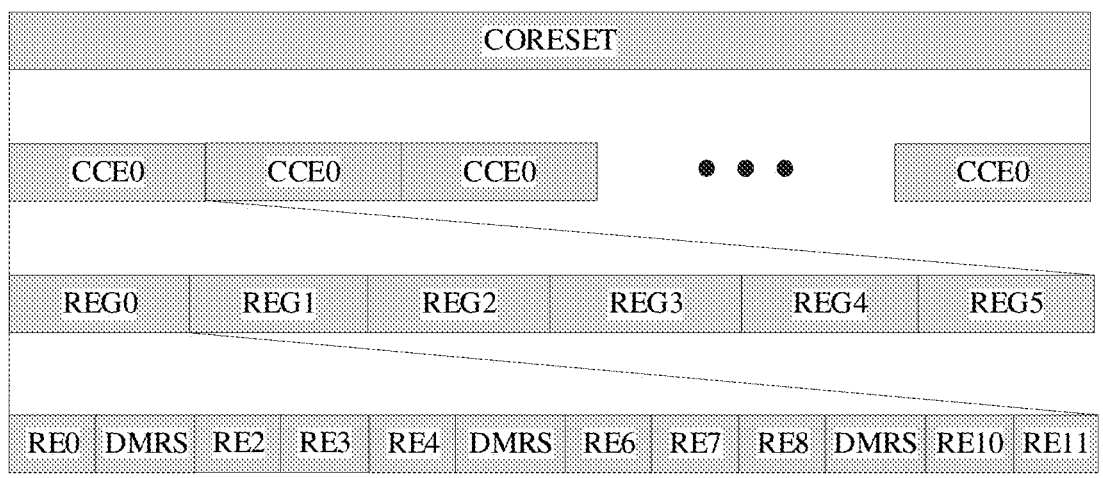
FIG. 2 is a schematic diagram of resource composition of a CORESET according to an embodiment of this application.

Control-resource set (CORESET): The CORESET represents a set of time-frequency resources used to carry a PDCCH. One CORESET includes one or more RBs in frequency domain, and may be represented as $N_{RB}^{CORESET}$, and $N_{CORESET}^{RB}$ may be indicated by a frequency domain resource in a higher layer parameter control-resource set information element (IE). One CORESET includes one, two, or three OFDM symbols in time domain, and may be represented as $N_{symbol}^{CORESET} \in \{1,2,3\}$, and $N_{symbol}^{CORESET}$ may be indicated by duration in a higher layer parameter control-resource set IE. When the higher layer parameter duration is 3, that is, the number of symbols of the CORESET indicated by the duration is 3, $N_{symbol}^{CORESET}=3$. The number of REGs included in one CORESET may be expressed as $N_{REG}^{CORESET}=N_{RB}^{CORESET} \times N_{symbol}^{CORESET}$. For a specific schematic diagram of resource composition of a CORESET, refer to FIG. 2. One CORESET (that is, a resource used by one PDCCH) is formed by aggregating one or more CCEs (that is, a supported AL) in one CORESET. One CCE includes six REGs, each REG is equal to one symbol in time domain and one RB in frequency domain, and one RB includes 12 REs in frequency domain.

A PDSCH mapping type (mapping type) A is one of two PDSCH time-domain resource mapping types in an NR system. The mapping type A means that a start symbol position of a physical downlink shared channel (PDSCH) may be {0, 1, 2, 3}. When the PDSCH and the PDCCH are scheduled in a same slot, the PDCCH is located in one or more OFDM symbols of the first three OFDM symbols of the slot. Intra-slot scheduling means that the PDCCH and the PDSCH scheduled by the PDCCH are located in the same slot. Cross-slot scheduling means that the PDCCH can schedule the PDSCH across slots, and the PDCCH and the PDSCH scheduled by the PDCCH are located in different slots.

A PDSCH mapping type (mapping type) B is one of the two PDSCH time-domain resource mapping types in the NR system. The mapping type B means that a start symbol position of the PDSCH may be {0, . . . , 12}. When the PDCCH and the PDSCH are scheduled in a same slot, a start symbol of the PDCCH is not later than a start symbol of the PDSCH scheduled by the PDCCH.

From a perspective of the number of time-domain symbols of the PDSCH, a scheduling type of the PDSCH may be classified into slot scheduling and mini-slot scheduling. A mini-slot includes two or more OFDM symbols, but the number of OFDM symbols included in the mini-slot is less than the number of OFDM symbols included in a slot. For example, the slot includes 14 OFDM symbols, and the mini-slot includes seven OFDM symbols. Scheduling a PDSCH by using a PDCCH may also be described as scheduling a PDSCH by using DCI, scheduling a PDSCH by using control information, or the like.

For a start symbol position and a time-domain length of the PDSCH, refer to Table 2.

TABLE 2

| PDSCH mapping type | Normal cyclic prefix | | | Extended cyclic prefix | | |
|---|---|---|---|---|---|---|
| | Start symbol position (S) | Time Domain Length (L) | S + L | Start symbol position (S) | Time Domain Length (L) | S + L |
| Type A | {0, 1, 2, 3} (Note 1) | {3, ..., 14} | {3, ..., 14} | {0, 1, 2, 3} (Note 1) | {3, ..., 12} | {3, ..., 12} |
| Type B | {0, ..., 12} | {2, 4, 7} | {2, ..., 14} | {0, ..., 10} | {2, 4, 6} | {2, ..., 12} |

(Note 1):
S = 3 only when DMRS-typeA-position = 3

Note 1 in Table 2: That s=3 only when DMRS-typeA-position=3 means that a start symbol position of TypeA may be equal to 3 only when a DMRS position is on the symbol 3. It can be learned from Table 2 that, for each of the slot scheduling and the mini-slot scheduling, a sum of a PDSCH start symbol position and a time-domain length does not exceed the number of symbols included in one slot. Currently, in the present invention, the sum of the PDSCH start symbol position and the time-domain length is also allowed to exceed the number of symbols included in one slot. This is not limited in the present invention.

A reduced capability (REDCAP) terminal device refers to a terminal device whose terminal capability is reduced in an mMTC scenario or an M2M communication scenario. The reduced terminal capability includes reduced terminal bandwidth, reduced receive/transmit antennas, and the like. The terminal bandwidth includes a radio frequency bandwidth and a base station bandwidth. In other words, bandwidth capability of the REDCAP terminal device is less than that of an existing (legacy) terminal device whose bandwidth capability is not reduced.

If a reduced capability terminal device is referred to as a first terminal device, and an existing terminal is referred to as a second terminal device, a difference between a type of the first terminal device and a type of the second terminal device may include at least one of the following:

1. Bandwidth capability is different. For example, a carrier bandwidth of the first terminal device is not greater than 50 MHz, and is, for example, at least one of 50 MHz, 40 MHz, 20 MHz, 15 MHz, 10 MHz, or 5 MHz, and a carrier bandwidth of the second terminal device is greater than 50 MHz.

2. Numbers of transmit and receive antennas are different. For example, the first terminal device may support two receive antennas and one transmit antenna (two receive antennas and one transmit antenna), or one receive antenna and one transmit antenna (one receive antenna and one transmit antenna). The second terminal device may support four receive antennas and two transmit antennas (four receive antennas and two transmit antennas). It can be understood that, under a condition of achieving a same data transmission rate, since the number of transmit and receive antennas of the first terminal device is less than the number of transmit and receive antennas of the second terminal device, a maximum coverage that can be achieved by data transmission between the first terminal device and a base station is smaller than a maximum coverage that can be achieved by data transmission between the second terminal device and the base station.

3. Maximum uplink transmit power is different. For example, the maximum uplink transmit power of the first terminal device may be a value ranging from 4 decibels relative to one milliwatt (dBm) to 20 dBm. The maximum uplink transmit power of the second terminal device may be 23 dBm or 26 dBm.

4. Protocol releases are different. The first terminal device may be a terminal device in an NR release 17 (Rel-17) or a later release of NR Rel-17. For example, the second terminal device may be a terminal device in an NR release 15 (Rel-15) or an NR release 16 (Rel-16). The second terminal device may also be referred to as an NR legacy (NR legacy) terminal device.

5. Carrier aggregation capability is different. For example, the first terminal device does not support carrier aggregation, and the second terminal device may support carrier aggregation. In another example, both the first terminal device and the second terminal device may support carrier aggregation, but a maximum number of carriers aggregated simultaneously supported by the first terminal device is less than a maximum number of carriers aggregated simultaneously supported by the second terminal device. For example, the first terminal device simultaneously supports aggregation of a maximum of two carriers. The second terminal device may simultaneously support aggregation of a maximum of 5 carriers or 32 carriers.

6. Duplexing capability is different. For example, the first terminal device supports half-duplex frequency division duplexing (FDD). The second terminal device supports full-duplex FDD.

7. Data processing time capability is different. For example, a minimum delay between receiving downlink data and sending a feedback for the downlink data by the first terminal device is greater than a minimum delay between receiving downlink data and sending a feedback for the downlink data by the second terminal device; and/or a minimum delay between sending uplink data and receiving a feedback for the uplink data by the first terminal device is greater than a minimum delay between sending uplink data and receiving a feedback for the uplink data by the second terminal device.

8. Processing ability/capability is different. For example, baseband processing capability of the first terminal device is lower than baseband processing capability of the second terminal device. The baseband processing capability may include at least one of the following: a maximum number of multiple-input multiple-output (MIMO) layers supported when the terminal device performs data transmission, the number of hybrid automatic repeat request (HARQ) processes supported by the terminal device, and a maximum transport block size (TBS) supported by the terminal device.

9. Uplink and/or downlink peak transmission rates are different. A peak transmission rate is a maximum data transmission rate that can be reached by a terminal device in a unit of time (for example, per second). The uplink peak rate supported by the first terminal device may be lower than the uplink peak rate supported by the second terminal device, and/or the downlink peak rate supported by the first terminal device may be lower than the downlink peak rate supported by the second terminal device. For example, an uplink peak rate of the first terminal device is less than or equal to 50 Mbit/s, and a downlink peak rate is less than or equal to 150 Mbit/s; and an uplink peak rate of the second terminal device is greater than or equal to 50 Mbit/s, and a downlink peak rate is greater than or equal to 150 Mbit/s. In another example, an uplink peak rate or a downlink peak rate of the first terminal device is on an order of hundreds of Mbps, and an uplink peak rate or a downlink peak rate of the second terminal device is on an order of Gbps.

10. Sizes of the buffer are different. The buffer may be understood as a total layer 2 (L2) buffer size, and is defined as a sum of bytes buffered in a radio link control (RLC) transmit window and a receive and reorder window of the terminal device and the number of bytes buffered in a packet data convergence protocol (PDCP) reorder window for all radio bearers. Alternatively, the buffer may be understood as a total number of soft channel bits that can be used for HARQ processing.

It should be noted that the reduced capability (REDCAP) terminal device mentioned in this embodiment of this application is merely an example of the first terminal type including the foregoing distinguishing feature. In other words, the first terminal type is a terminal device including at least one distinguishing feature of the first terminal device, and the first terminal type includes but is not limited to the reduced capability (REDCAP) terminal device. The existing terminal device (or the NR legacy terminal device described below) is merely an example of the first terminal type including the foregoing distinguishing feature. In other words, the second terminal type is a terminal device including at least one distinguishing feature of the second terminal device, and the second terminal type includes but is not limited to the existing terminal device (or the NR legacy terminal device described below).

The following further describes in detail a method for enhancing a physical downlink control channel provided in an embodiment of this application.

Figure 3:
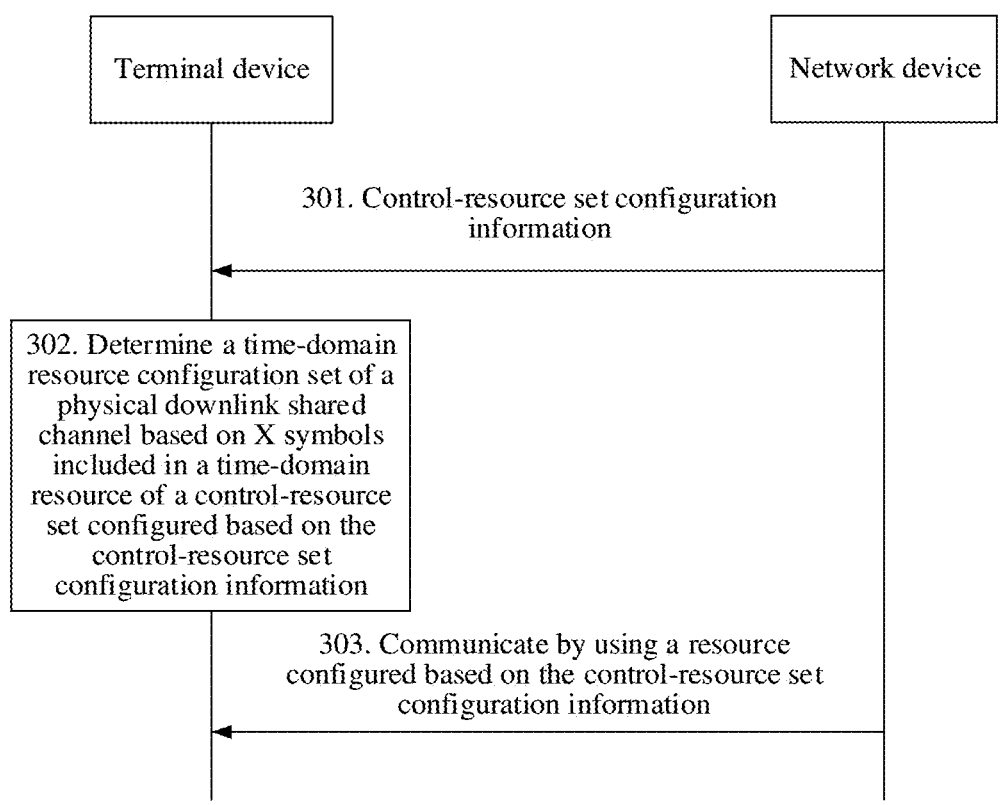
FIG. 3 is a schematic flowchart of a method for enhancing a physical downlink control channel according to an embodiment of this application.

FIG. 3 is a schematic flowchart of a method for enhancing a physical downlink control channel according to an embodiment of this application. As shown in FIG. 3, the method for enhancing a physical downlink control channel includes the following step 301 to step 303. The method shown in FIG. 3 may be performed by a terminal device and a network device, or a chip in a terminal device and a chip in a network device. FIG. 3 is described by using an example in which a terminal device and a network device perform the method.

301. A network device sends CORESET configuration information to a terminal device, where the CORESET configuration information is used for configuring a time-domain resource and a frequency-domain resource of a CORESET. The time-domain resource includes X time-domain symbols, the X time-domain symbols are consecutive in time domain, X is an integer greater than or equal to 1 and less than or equal to M, and M is an integer greater than or equal to 4.

The network device generates (or determines) the CORESET configuration information, and broadcasts (or sends) the CORESET configuration information to the terminal device. It should be known that M represents a maximum number of the time-domain symbols supported in a CORESET time-frequency resource allocation table. For example, when a value of M is 6, a maximum of the time-domain symbols that are of the CORESET configured by the terminal device based on the CORESET configuration information may be six time-domain symbols, that is, the maximum value of X is 6. The CORESET configuration information may configure one or more CORESETs. In this case, frequency-domain resources of the CORESETs may overlap with each other, may partially overlap with each other, or may not overlap at all.

The CORESET configuration information may be row indication information, and each piece of row indication information is corresponding to preset parameter information of a time-domain resource and a frequency-domain resource of a CORESET. In this case, the network device may send the row indication information to the terminal device to dynamically configure time-domain resource parameter information and frequency-domain resource parameter information included in the CORESET configuration information. Optionally, the CORESET configuration information may alternatively be preset time-domain resource parameter information and frequency-domain resource parameter information of a CORESET. It should be known that preset parameter information of the time-domain resource and frequency-domain resource of the CORESET includes the number of time-domain symbols and the number of frequency-domain resources RBs. For a CORESET0, the CORESET configuration information may further include a SS/PBCH block (SSB) and CORESET multiplexing pattern, an offset (also referred to as an offset) parameter value between the CORESET and the SSB, and the like.

In an application scenario, a communication protocol includes a preset CORESET configuration information set, the CORESET configuration information set includes at least one group of CORESET configuration information, and each group of CORESET configuration information includes the number of frequency-domain resources RBs and the number of time-domain symbols. In addition, each group of CORESET configuration information corresponds to the row indication information. For a CORESET0, the CORESET configuration information may further include a SS/PBCH block (SSB) and CORESET multiplexing pattern, an offset (also referred to as an offset) parameter value between the CORESET and the SSB, and the like. In this case, the network device may broadcast (or send) the row indication information to the terminal device, so that the terminal device can determine the time-domain resource and the frequency-domain resource of the CORESET from the preset CORESET configuration information set based on the row indication information. That is, the network device may dynamically configure, based on the row indication information, the time-domain resource parameter information and the frequency-domain resource parameter information included in the CORESET configuration information. For example, FIG. 4 shows a CORESET0 time-frequency resource allocation table when {SSB, PDCCH} subcarrier spacing (SCS) is {15, 30}kHz. When the terminal device receives CORESET0 configuration information such as row indication information shown in a module 40, in this case, the terminal device may determine, from the CORESET0 time-frequency resource allocation table based on the row indication information of the module 40, that the CORESET0 configuration information is shown in a module 41. Parameter information of a time-domain resource and a frequency-domain resource of the CORESET0: "An SSB and CORESET multiplexing pattern is a multiplexing pattern 1, 24 RBs, and 2 time-domain symbols, and an offset parameter value is 5".

In another application scenario, the network device may further broadcast (or send) CORESET configuration information to the terminal device, where the CORESET configuration information includes the number of frequency-domain resources RBs and the number of time-domain symbols. For a CORESET0, the CORESET configuration information may further include a SS/PBCH block (SSB) and CORESET multiplexing pattern, an offset (also referred to as an offset) parameter value between the CORESET and the SSB, and the like. For example, that the CORESET configuration information is CORESET0 configuration information is used as an example. In this case, the network device may send the CORESET0 configuration information to the terminal device as follows: "An SSB and CORESET multiplexing pattern is a multiplexing pattern 1, 24 RBs, two time-domain symbols, and an offset parameter value is 5".

302. The terminal device obtains CORESET configuration information, and determines a PDSCH time-domain resource configuration set based on the X time-domain symbols, where the PDSCH time-domain resource configuration set is for PDSCH time-domain resource allocation.

The terminal device receives the CORESET configuration information, and determines the time-domain resource and the frequency-domain resource of the CORESET based on the CORESET configuration information. Further, the terminal device may determine a target PDSCH time-domain resource configuration set from the PDSCH time-domain resource configuration set based on the X time-domain symbols in the CORESET, and determine the PDSCH time-domain resource configuration information based on the target PDSCH time-domain resource configuration set.

The PDSCH time-domain resource configuration set may be a PDSCH time-domain resource configuration table or a PDSCH time-domain resource configuration matrix. The PDSCH time-domain resource configuration set includes at least one group of PDSCH time-domain resource allocation information. The PDSCH time-domain resource configuration set may include but is not limited to a first PDSCH time-domain resource configuration set and a second PDSCH time-domain resource configuration set. The first PDSCH time-domain resource configuration set includes a mapping type of a PDSCH time-domain resource, and the mapping type includes a mapping type A and a mapping type B. The second PDSCH time-domain resource configuration set includes at least one group of PDSCH time-domain resource allocation information, and the PDSCH time-domain resource allocation information includes at least one of a mapping type of a PDSCH time-domain resource, a PDSCH time-domain start symbol, or a PDSCH time-domain length.

In an implementation, each group of PDSCH time-domain resource configuration information in the second PDSCH time-domain resource configuration set corresponds to the row indication information. In other words, each group of PDSCH time-domain resource configuration information corresponds to the row indication information, and the PDSCH time-domain resource configuration information may be determined based on the row indication information.

In another implementation, each group of PDSCH time-domain resource configuration information in the second PDSCH time-domain resource configuration set corresponds to the row indication information. In other words, each group of PDSCH time-domain resource configuration information corresponds to the row indication information, and the PDSCH time-domain resource configuration information may be jointly determined based on the row indication information and the DMRS position of the PDSCH mapping type A.

In a possible implementation, the second PDSCH time-domain resource configuration set is predefined or pre-configured; or the network device sends indication information to the terminal device, where the indication information indicates configuration information of the second PDSCH time-domain resource configuration set, and the indication information includes one or more of a system information block 1, radio resource control signaling, media access signaling, and downlink control information.

In a possible implementation, when the X time-domain symbols included in the CORESET are less than or equal to 3 in number, the terminal device may determine the first PDSCH time-domain resource configuration set. Further, the terminal device may determine the time-domain resource configuration information of the PDSCH based on the first PDSCH time-domain resource configuration set.

For example, the first PDSCH time-domain resource configuration set is a first PDSCH time-domain resource allocation table shown in Table 3. When the time-domain resource of the CORESET that is configured by the terminal device based on the CORESET configuration information includes two symbols, the terminal device may determine the first PDSCH time-domain resource configuration set (or also referred to as a first PDSCH time-domain resource configuration table) shown in Table 3, and then the terminal device may determine the time-domain resource configuration information of the PDSCH based on the first PDSCH time-domain resource configuration set.

TABLE 3

| Row indication information (Row index) | Demodulation reference signal-Type A-Position (dmrs-Type A-Position) | Mapping type (PDSCH mapping type) | $K_o$ | S | L |
| --- | --- | --- | --- | --- | --- |
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

K0 is an offset (slot) between the PDCCH and the PDSCH, S is a PDSCH start symbol, and L is a PDSCH time-domain length (symbol). It should be learned that all the PDSCH time-domain resource configuration information included in the first PDSCH time-domain resource allocation table may be obtained by a developer through measurement and calculation based on experimental environment data, and may be correspondingly adjusted subsequently based on a specific application scenario. This is not specifically limited herein.

It should be learned that in the first PDSCH time-domain resource allocation table, the mapping type of the PDSCH time-domain resource includes a mapping type A (TypeA) and a mapping type B (TypeB). In the first PDSCH time-domain resource allocation table, when the PDSCH start symbol is greater than 3, only PDSCH time-domain resource configuration information including a mapping type TypeB can be used.

In a possible implementation, when the X time-domain symbols included in the CORESET are less than or equal to 3 in number, the terminal device may determine the second PDSCH time-domain resource configuration set. Further, the terminal device may determine the time-domain resource configuration information of the PDSCH based on the second PDSCH time-domain resource configuration set.

For example, the second PDSCH time-domain resource configuration set is a second PDSCH time-domain resource allocation table shown in Table 4. When the time-domain resource of the CORESET that is configured by the terminal device based on the CORESET configuration information includes five symbols, the terminal device may determine the second PDSCH time-domain resource configuration set (or also referred to as a second PDSCH time-domain resource configuration table) shown in Table 4, and then the terminal device may determine the time-domain resource configuration information of the PDSCH based on the second PDSCH time-domain resource configuration set.

TABLE 4

| Row indication information (Row index) | Demodulation reference signal-Type A-Position (dmrs-Type A-Position) | Mapping type (PDSCH mapping type) | $K_o$ | S | L |
|---|---|---|---|---|---|
| 1 | 2, 3 | Type B | 0 | 4 | 10 |
| 2 | 3 | Type B | 0 | 4 | 9 |
|   | 2 | Type B | 0 | 4 | 8 |
| 3 | 3 | Type B | 0 | 4 | 7 |
|   | 2 | Type B | 0 | 4 | 6 |
| 4 | 3 | Type B | 0 | 4 | 5 |
|   | 2 | Type B | 0 | 4 | 4 |
| 5 | 3 | Type B | 0 | 5 | 9 |
|   | 2 | Type B | 0 | 5 | 8 |
| 6 | 3 | Type B | 0 | 5 | 7 |
|   | 2 | Type B | 0 | 5 | 6 |
| 7 | 3 | Type B | 0 | 5 | 5 |
|   | 2 | Type B | 0 | 5 | 4 |
| 8 | 2, 3 | Type B | 0 | 5 | 2 |
| 9 | 2 | Type B | 0 | 6 | 8 |
|   | 3 | Type B | 0 | 6 | 7 |
| 10 | 2 | Type B | 0 | 6 | 6 |
|   | 3 | Type B | 0 | 6 | 5 |
| 11 | 2, 3 | Type B | 0 | 6 | 4 |
| 13 | 2, 3 | Type B | 0 | 8 | 4 |
| 12 | 2, 3 | Type B | 0 | 9 | 2 |
| 13 | 2, 3 | Type B | 0 | 9 | 4 |
| 14 | 2, 3 | Type B | 0 | 10 | 4 |
| 15 | 2, 3 | Type B | 0 | 12 | 2 |

K0 is an offset (slot) between the PDCCH and the PDSCH, S is a PDSCH start symbol, and L is a PDSCH time-domain length (symbol). It should be learned that all the PDSCH time-domain resource configuration information included in the second PDSCH time-domain resource allocation table may be obtained by a developer through measurement and calculation based on experimental environment data, and may be correspondingly adjusted subsequently based on a specific application scenario. This is not specifically limited herein.

It should be learned that the second PDSCH time-domain resource allocation table may include only a PDSCH time-domain resource whose mapping type is TypeB, or may include both a PDSCH time-domain resource whose mapping type is TypeA and a PDSCH time-domain resource whose mapping type is TypeB. This is not forcibly limited herein.

In a possible implementation, the second PDSCH time-domain resource configuration set may include one or more of the following principles: 1. PDSCH time-domain resource allocation starts from the first time-domain symbol after the CORESET. 2. A CORESET corresponding to the PDSCH time-domain resource configuration set may include a maximum of six time-domain symbols. 3. Some or all first PDSCH time-domain resource configuration sets are supported in including PDSCH time-domain resource allocation information of a mapping type TypeB. 4. A value range of the PDSCH time-domain length (symbol) L is {4, 5, 14-S}.

303. The network device communicates with the terminal device by using a resource configured based on the CORESET configuration information.

After the terminal device determines the frequency-domain resource and the time-domain resource of the CORESET based on the CORESET configuration information, the network device may communicate with the terminal device (that is, transmit control information or data information) by using the frequency-domain resource and the time-domain resource of the CORESET. The resource configured based on the CORESET configuration information may include a time-domain resource and a frequency-domain resource of the CORESET, and may further include a time-domain resource and a frequency-domain resource of a PDCCH that are obtained based on the CORESET, and a time-domain resource and a frequency-domain resource of a PDSCH that are configured based on the CORESET.

For a REDCAP terminal device in a connected mode or an inactive mode in NR, when no PDSCH time-domain resource configuration set dedicated to the terminal device or common to a serving cell is configured for the network device, PDSCH time-domain resource allocation for the REDCAP terminal device is limited. In a possible implementation, the CORESET configured based on the CORESET configuration information in this embodiment of this application may be any one of a CORESET (namely, CORESET0) whose index value is 0 and a CORESET whose index value is not 0. By implementing this manner, a problem that PDSCH time-domain resource allocation of the REDCAP terminal device is limited can be resolved.

It can be learned that by implementing the method for enhancing a physical downlink control channel described in FIG. 3, the terminal device may determine the time-domain resource and the frequency-domain resource of the CORESET based on the CORESET configuration information sent by the network device. The number of time-domain symbols included in the time-domain resource of the CORESET may be greater than 3. In other words, the terminal device may provide more control channel elements by increasing the number of time-domain symbols of the CORESET, thereby enhancing transmission performance of the physical downlink control channel. In addition, the terminal device may determine the time-domain resource configuration information of the physical downlink shared channel based on the number of time-domain symbols of the CORESET, thereby ensuring flexibility of time-domain resource allocation of the physical downlink shared channel.

Figure 5:
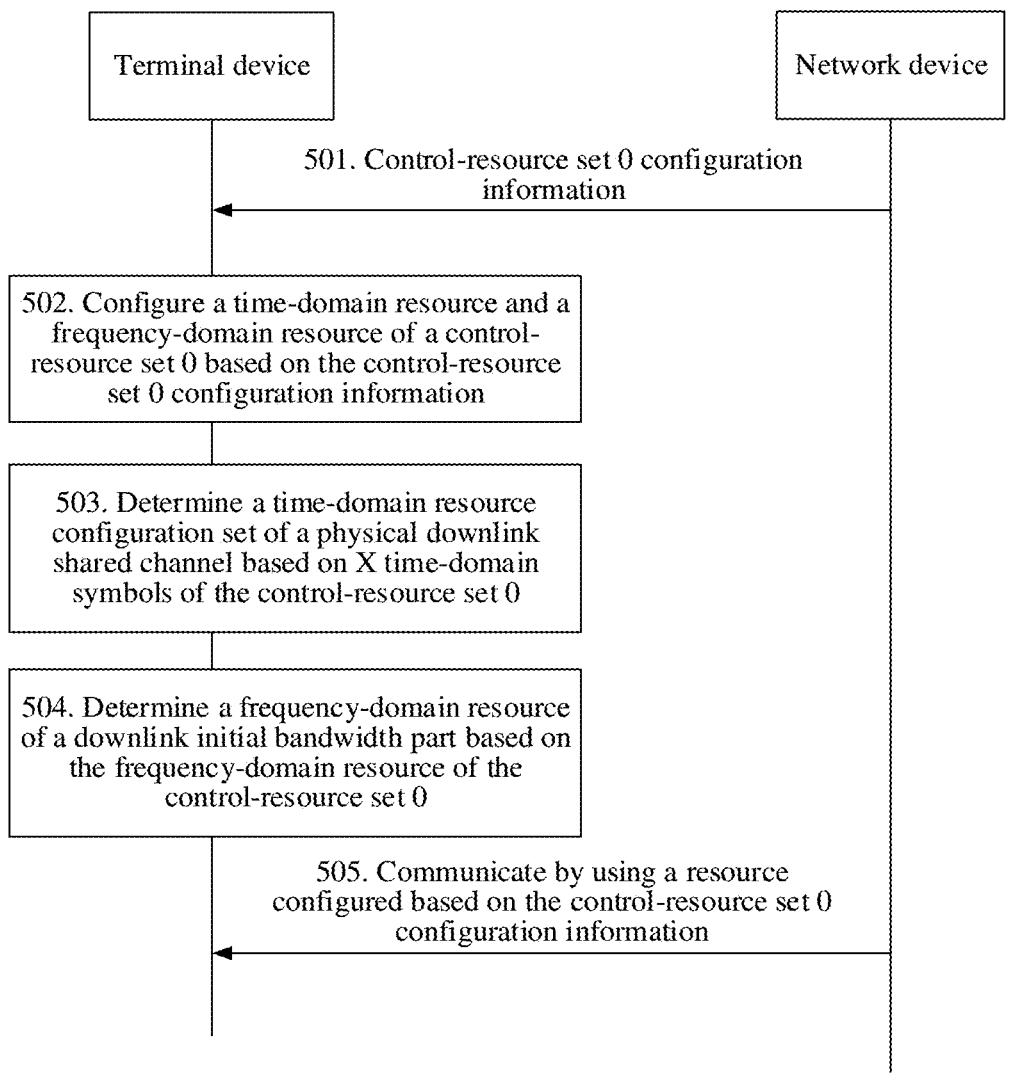
FIG. 5 is a schematic flowchart of another method for enhancing a physical downlink control channel according to an embodiment of this application.

FIG. 5 is a schematic flowchart of another method for enhancing a physical downlink control channel according to an embodiment of this application. As shown in FIG. 5, the CORESET configuration information is CORESET0 configuration information, and the CORESET0 configuration information is used for configuring a time-domain resource and a frequency-domain resource of a CORESET0.

501. A network device sends CORESET0 configuration information to a terminal device, where the CORESET0 configuration information is used for configuring a time-domain resource and a frequency-domain resource of a CORESET0. The time-domain resource includes X time-domain symbols, the X time-domain symbols are consecutive in time domain, X is an integer greater than or equal to 1 and less than or equal to M, and M is an integer greater than or equal to 4.

For example, before step 501, the network device generates (or determines) the CORESET0 configuration information. The network device may broadcast the CORESET0 configuration information to the terminal device in a broadcast manner. The CORESET0 configuration information may be row indication information, and each piece of row indication information corresponds to preset parameter information of a time-domain resource and a frequency-domain resource of the CORESET. Alternatively, the CORESET0 configuration information may be preset parameter information of a time-domain resource and a frequency-domain resource of the CORESET0.

In a possible implementation, in an NR initial access process of the terminal device, the network device may send an MIB to the terminal device by using a PBCH. The MIB includes configuration information of a system information block 1. The configuration information of the system information block 1 indicates control-resource set CORESET0 configuration information. For example, the network device may indicate the configuration information of the CORESET0 by using the configuration information (also referred to as a pdcch-ConfigSIB1 parameter) of the system information block 1 in the MIB.

Optionally, in an NR initial access scenario of the terminal device, the network device may send an MIB to the terminal device by using a PBCH, and an idle bit in the MIB indicates the control-resource set CORESET0 configuration information.

Optionally, in an NR initial access process of the terminal device, when an NR frequency band is FR1 (450 MHz to 6000 MHz, also referred to as sub-6 GHz), the network device may further send a newly added timing bit to the terminal device by using a PBCH, and the newly added timing bit indicates the control-resource set CORESET0 configuration information. For example, the network device may indicate the CORESET0 configuration information by using two high-order bits in newly added (or additionally added) timing-related bits on the PBCH.

Optionally, in an NR initial access process of the terminal device, when an NR frequency band is FR1, the network device may send an MIB and a newly added timing bit to the terminal device by using a PBCH, and the MIB and the newly added timing bit indicate the control-resource set CORESET0 configuration information.

In another possible implementation, the terminal device is in a non-NR initial access scenario, in other words, the terminal device was once connected to the network device or once camped on a serving cell corresponding to the network device. In this case, the network device sends indication information to the terminal device, where the indication information indicates the control-resource set CORESET0 configuration information, and the indication information includes one or more of a system information block 1, radio resource control signaling, media access signaling, and downlink control information.

502. The terminal device obtains the CORESET0 configuration information, and configures a time-domain resource and a frequency-domain resource of the CORESET0 based on the CORESET0 configuration information.

The terminal device may be an NR REDCAP terminal device and/or an NR legacy terminal device. Because the NR REDCAP terminal device and the NR legacy terminal device have different bandwidth capability, the NR REDCAP terminal device and the NR legacy terminal device may respectively use independent manners or mechanisms for obtaining the CORESET0 configuration information, or may use a same manner or mechanism for obtaining the CORESET0 configuration information.

In an application scenario, the mMTC scenario includes two types of terminal devices: an NR REDCAP terminal device and an NR legacy terminal device. The NR REDCAP terminal device and the NR legacy terminal device share a same SSB (that is, a same manner or mechanism for obtaining the CORESET0 configuration information used above). In this case, the network device may indicate the CORESET0 configuration information of the NR REDCAP terminal device by using the pdcch-ConfigSIB1 parameter in the MIB, and also indicate the CORESET0 configuration information of the NR legacy terminal device by using the pdcch-ConfigSIB1 parameter in the MIB. To be specific, the NR REDCAP terminal device detects or receives the SSB broadcast by the network device, and synchronizes time and frequency with the network device based on the SSB. Further, the NR REDCAP terminal device may obtain an MIB carried on the PBCH, and obtain the CORESET0 configuration information from a predefined or preconfigured CORESET #0A time-frequency resource configuration table based on the CORESET0 configuration information in the MIB, which is, for example, shown in Table 5. It should be learned that Table 5 is a predefined or preconfigured CORESET time-frequency resource allocation table for a time-domain resource and a frequency-domain resource of a CORESET when {SSB, PDCCH} SCS is {15, 30} kHz, and may be referred to as a CORESET #0A time-frequency resource configuration table.

TABLE 5

| Index (Index) | SSB and CORESET multiplexing pattern (SS/PBCH block and CORESET multiplexing pattern) | Number of frequency-domain resource blocks (Number of RBs) | Number of time-domain symbols (Number of Symbols) | Offset (Offset (RBs)) |
| --- | --- | --- | --- | --- |
| 0 | 1 | 24 | 2 | 5 |
| 1 | 1 | 24 | 2 | 7 |
| 2 | 1 | 24 | 3 | 5 |
| 3 | 1 | 24 | 3 | 7 |
| 4 | 1 | 24 | 4 | 5 |
| 5 | 1 | 24 | 4 | 7 |
| 6 | 1 | 24 | 5 | 5 |

TABLE 5-continued

| Index (Index) | SSB and CORESET multiplexing pattern (SS/PBCH block and CORESET multiplexing pattern) | Number of frequency-domain resource blocks (Number of RBs) | Number of time-domain symbols (Number of Symbols) | Offset (Offset (RBs)) |
| --- | --- | --- | --- | --- |
| 7  | 1 | 24 | 5 | 7  |
| 9  | 1 | 48 | 1 | 18 |
| 10 | 1 | 48 | 1 | 20 |
| 11 | 1 | 48 | 2 | 18 |
| 12 | 1 | 48 | 2 | 20 |
| 13 | 1 | 48 | 3 | 18 |
| 14 | 1 | 48 | 3 | 20 |
| 13 | 1 | 48 | 4 | 18 |
| 14 | 1 | 48 | 4 | 20 |

TABLE 6

| Index (Index) | SSB and CORESET multiplexing pattern (SS/PBCH block and CORESET multiplexing pattern) | Number of frequency-domain resource blocks (Number of RBs) | Number of time-domain symbols (Number of Symbols) | Offset (Offset (RBs)) |
| --- | --- | --- | --- | --- |
| 0  | 1 | 24 | 2 | 5  |
| 1  | 1 | 24 | 2 | 6  |
| 2  | 1 | 24 | 2 | 7  |
| 3  | 1 | 24 | 2 | 8  |
| 4  | 1 | 24 | 3 | 5  |
| 5  | 1 | 24 | 3 | 6  |
| 6  | 1 | 24 | 3 | 7  |
| 7  | 1 | 24 | 3 | 8  |
| 8  | 1 | 48 | 1 | 18 |
| 9  | 1 | 48 | 1 | 20 |
| 10 | 1 | 48 | 2 | 18 |
| 11 | 1 | 48 | 2 | 20 |
| 12 | 1 | 48 | 3 | 18 |
| 13 | 1 | 48 | 3 | 20 |
| 14 | Reserved | | | |
| 15 | Reserved | | | |

All the CORESET time-frequency resource configuration information in the preset CORESET #0A time-frequency resource allocation table may be obtained by a developer through measurement and calculation based on experimental environment data, and may be correspondingly adjusted subsequently based on a specific application scenario. This is not specifically limited herein.

To be specific, the NR REDCAP terminal device detects or receives the SSB broadcast by the network device, and the NR REDCAP terminal device synchronizes time and frequency with the network device based on the SSB. Further, the NR REDCAP terminal device may obtain an MIB carried on the PBCH, obtain row indication information 0 carried in a configuration information (also referred to as pdcch-ConfigSIB1) parameter of a system information block 1 in the MIB, and configure a time-domain resource and a frequency-domain resource of the CORESET0 from the CORESET #0A configuration table shown in Table 5 based on the row indication information 0: "The SSB and CORESET multiplexing pattern is multiplexing pattern 1, 24 RBs, two time-domain symbols, and an offset parameter value is 5".

The NR legacy terminal device detects or receives the SSB broadcast by the network device, and the NR legacy terminal device synchronizes time and frequency with the network device based on the SSB. Further, the NR legacy terminal device may obtain an MIB carried on the PBCH, and obtain the CORESET0 configuration information from a preset CORESET #0 time-frequency resource configuration table shown in Table 6 based on the CORESET0 configuration information in the MIB. It should be learned that Table 6 is a CORESET time-frequency resource allocation table, for a preset time-domain resource and a preset frequency-domain resource of the CORESET, defined in the communication protocol Rel-15/16 when {SSB, PDCCH} SCS is {15, 30} kHz, and is also referred to as a CORESET #0 time-frequency resource configuration table. CORESET time-frequency resource configuration information in the CORESET #0 time-frequency resource configuration table is obtained according to a communication protocol or obtained by a developer through measurement and calculation based on experimental data.

In another application scenario, the mMTC scenario includes two types of terminal devices: an NR REDCAP terminal device and an NR legacy terminal device. The NR REDCAP terminal device and the NR legacy terminal device respectively use independent SSBs (that is, independent manners or mechanisms for obtaining the CORESET0 configuration information). In this case, the network device may broadcast or send two MIBs: an MIB1 and an MIB2 by using a PBCH. The MIB1 indicates CORESET0 configuration information of the NR REDCAP terminal device, and the MIB2 indicates CORESET0 configuration information of the NR legacy terminal device. To be specific, the NR REDCAP terminal device detects or receives the SSB broadcast by the network device, and synchronizes time and frequency with the network device based on the SSB. Further, the NR REDCAP terminal device may obtain the MIB1 carried on the PBCH, and obtain the CORESET0 configuration information from a preset CORESET #0A time-frequency resource configuration table shown in Table 5 based on the CORESET0 configuration information in the MIB1. The NR legacy terminal device detects or receives the SSB broadcast by the network device, and synchronizes time and frequency with the network device based on the SSB. Further, the NR legacy terminal device may obtain the MIB2 carried on the PBCH, and obtain the CORESET0 configuration information from a preset CORESET #0 time-frequency resource configuration table shown in Table 6 based on the CORESET0 configuration information in the MIB2.

503. The terminal device determines a PDSCH time-domain resource configuration set based on the X time-domain symbols of the CORESET0 time-domain resource, where the PDSCH time-domain resource configuration set is for PDSCH time-domain resource allocation.

The terminal device receives the CORESET0 configuration information, and determines a time-domain resource and a frequency-domain resource of the CORESET0 based on the CORESET0 configuration information. Further, the terminal device may determine a target PDSCH time-domain resource configuration set from the PDSCH time-domain resource configuration set based on the X time-domain symbols in the CORESET0, and determine the PDSCH time-domain resource configuration information based on the target PDSCH time-domain resource configuration set.

In an embodiment, the PDSCH time-domain resource configuration set may be a PDSCH time-domain resource configuration table or a PDSCH time-domain resource matrix. The PDSCH time-domain resource configuration set may be divided into a first PDSCH time-domain resource configuration set and a second PDSCH time-domain resource configuration set. Further, when the X time-domain symbols included in the CORESET0 are less than or equal to 3 in number, the terminal device may determine the first PDSCH time-domain resource configuration set, and determine the time-domain resource configuration information of the PDSCH from the first PDSCH time-domain resource configuration set. For example, for details of the first PDSCH time-domain resource configuration set, refer to the first PDSCH time-domain resource allocation table shown in Table 3 in the foregoing embodiment. Further, when the X time-domain symbols included in the CORESET0 are greater than 3 in number, the terminal device determines the second PDSCH time-domain resource configuration set, and determines the time-domain resource configuration information of the PDSCH based on the second PDSCH time-domain resource configuration set. For example, for details of the second PDSCH time-domain resource configuration set, refer to the second PDSCH time-domain resource allocation table shown in Table 4 in the foregoing embodiment. The PDSCH time-domain resource configuration set includes at least one group of PDSCH time-domain resource allocation information, and each group of PDSCH time-domain resource configuration information in the at least one group of PDSCH time-domain resource allocation information corresponds to the row indication information.

In a possible implementation, the second PDSCH time-domain resource configuration set is predefined or preconfigured; or the network device sends indication information to the terminal device, where the indication information indicates configuration information of the second PDSCH time-domain resource configuration set, and the indication information includes one or more of a system information block 1, radio resource control signaling, media access signaling, and downlink control information.

In a possible implementation, the terminal device may determine the target PDSCH time-domain resource allocation information from the PDSCH time-domain resource set based on the row indication information.

For example, if the terminal device obtains that the time-domain symbol included in the CORESET0 configured based on the CORESET0 configuration information is 5, the terminal device determines the second PDSCH time-domain resource allocation table shown in Table 4. If the row indication information obtained by the terminal device is 1, the PDSCH time-domain resource allocation information determined by the terminal device from the second PDSCH time-domain resource allocation table shown in Table 4 based on the row indication information 1 is: "Position information (also referred to as dmrs-TypeA-Position) of a demodulation reference signal (DMRS) of a PDSCH time-domain resource mapping type A is 2 or 3 time-domain symbol positions, a mapping type is TypeB, an offset (slot) K0 between the PDCCH and the PDSCH is 0, a start symbol of the PDSCH is 4, and the PDSCH time-domain length (symbol) is 10".

In a possible implementation, the terminal device may determine the target PDSCH time-domain resource allocation information from the PDSCH time-domain resource set based on the row indication information and the position information (namely, dmrs-TypeA-Position) of the DMRS in the PDSCH time-domain resource mapping type A. The target PDSCH time-domain resource allocation information includes a mapping type of a PDSCH time-domain resource, a PDSCH time-domain start symbol, and a PDSCH time-domain length. In such a manner of determining the target PDSCH time-domain resource allocation information, one piece of row indication information may correspond to a plurality of groups of PDSCH time-domain resource allocation information. Compared with a manner in which only the row indication information indicates the PDSCH time-domain resource allocation information, more PDSCH time-domain resource configuration combinations can be supported.

For example, if the terminal device obtains that the time-domain symbol included in the CORESET0 configured based on the CORESET0 configuration information is 5, the terminal device determines the second PDSCH time-domain resource allocation table shown in Table 4. If the row indication information obtained by the terminal device is 2, and dmrs-TypeA-Position is 3, the PDSCH time-domain resource allocation information that the terminal device may determine from the second PDSCH time-domain resource allocation table shown in Table 4 is: "The mapping type is TypeB, the offset (slot) K0 between the PDCCH and the PDSCH is 0, the start symbol of the PDSCH is 4, and the time-domain length (symbol) of the PDSCH is 9".

In a possible implementation, the terminal device may further determine the target PDSCH time-domain resource allocation information from the PDSCH time-domain resource configuration set based on an idle bit in the MIB or a timing bit newly added to the PBCH, row indication information, and dmrs-TypeA-Position. By using this method, more PDSCH time-domain resource configuration combinations can be supported.

In a possible implementation, the terminal device may determine the target PDSCH time-domain resource configuration information from the PDSCH time-domain resource configuration set based on a time-domain resource allocation indication field in DCI carried on the PDCCH and/or position information (namely, dmrs-TypeA-Position) of a DMRS of a PDSCH time-domain resource classification mapping type A sent by the network device. A mapping relationship exists between an indication status of the time-domain resource allocation indication field in the DCI and the row indication information. For example, when the time-domain resource allocation indication field in the DCI is 001, the row indication information is correspondingly mapped to 1.

In an example, after configuring the time-domain resource and the frequency-domain resource of the CORESET0 based on the CORESET0 configuration information, the terminal device obtains, by listening, the DCI from a PDCCH common search space (CSS) set corresponding to the CORESET0. Further, the terminal device may obtain the time-domain resource allocation indication field from the DCI, determine the row indication information based on the indication status of the time-domain resource allocation indication field, and further determine the PDSCH time-domain resource allocation information from the PDSCH time-domain resource set based on the row indication information.

In another example, after configuring the time-domain resource and the frequency-domain resource of the CORESET0 based on the CORESET0 configuration information, the terminal device obtains, by listening, the DCI from the PDCCH-CSS set corresponding to the CORESET0. Further, the terminal device may obtain the time-domain resource allocation indication field from the DCI, obtain dmrs- TypeA-Position from the MIB, and obtain the row indication information based on the indication status of the time-domain resource allocation indication field in the DCI. Further, the terminal device may determine the target PDSCH time-domain resource allocation information from the PDSCH time-domain resource configuration set based on the row indication information and dmrs-TypeA-Position.

In a possible implementation, the terminal device may obtain dmrs-TypeA-Position by using any type of signaling of the MIB, the SIB1, radio resource control (RRC), a media access control element (MAC CE), or the DCI.

504. The terminal device determines a frequency-domain resource of a downlink initial bandwidth part (BWP) based on the frequency-domain resource of the CORESET0.

Figure 6:
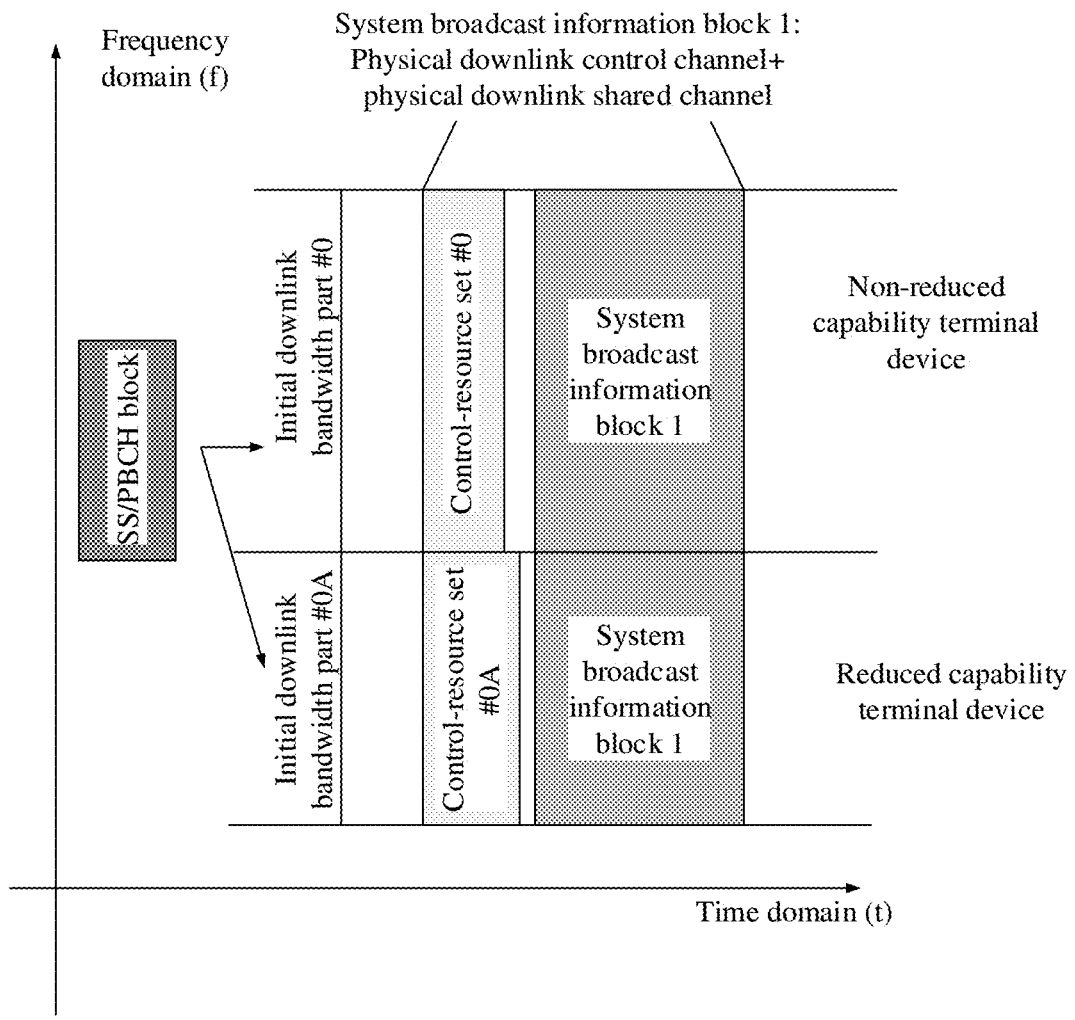
FIG. 6 is a schematic diagram of time-frequency resources in an initial access process of a reduced capability terminal device and a normal terminal device according to an embodiment of this application.

The terminal device determines a downlink initial bandwidth part (initial BWP) based on the frequency-domain resource of the CORESET0. For example, time-frequency resources used by the NR REDCAP terminal device and the NR legacy terminal device in an NR initial access process are shown in FIG. 6. For ease of differentiation, a DL initial BWP determined by the NR REDCAP terminal device based on the frequency-domain resource of the CORESET0 is referred to as a downlink initial bandwidth part #0A, and a DL initial BWP determined by the NR legacy terminal device based on the frequency-domain resource of the CORESET0 is referred to as a downlink initial bandwidth part #0.

505. The network device communicates with the terminal device by using a resource configured based on the CORESET0 configuration information.

The resource configured by the CORESET0 configuration information may include a time-domain resource and a frequency-domain resource of the CORESET0, and may further include the time-domain resource of the PDSCH determined in step 503 and the frequency-domain resource determined in step 504.

The terminal device configures a time-domain resource and a frequency-domain resource of the CORESET0 based on the CORESET0 configuration information, and determines the time domain allocation information of the PDSCH based on the X time-domain symbols included in the time-domain resource of the CORESET0. Further, the network device may determine a PDSCH time-domain resource based on the time domain allocation information of the PDSCH, and transmit a system information block 1 (SIB1) to the terminal device based on the PDSCH time-domain resource.

In an application scenario, time-frequency resource usage efficiency may be improved in a manner of increasing a time-domain resource occupied by the CORESET in time domain by repeating a plurality of CORESETs. In this case, the terminal device may determine a PDSCH time-domain resource allocation set based on a total number of repeated time-domain symbols of the CORESET, where the PDSCH time-domain resource allocation set is for PDSCH time-domain resource allocation.

Figure 7:
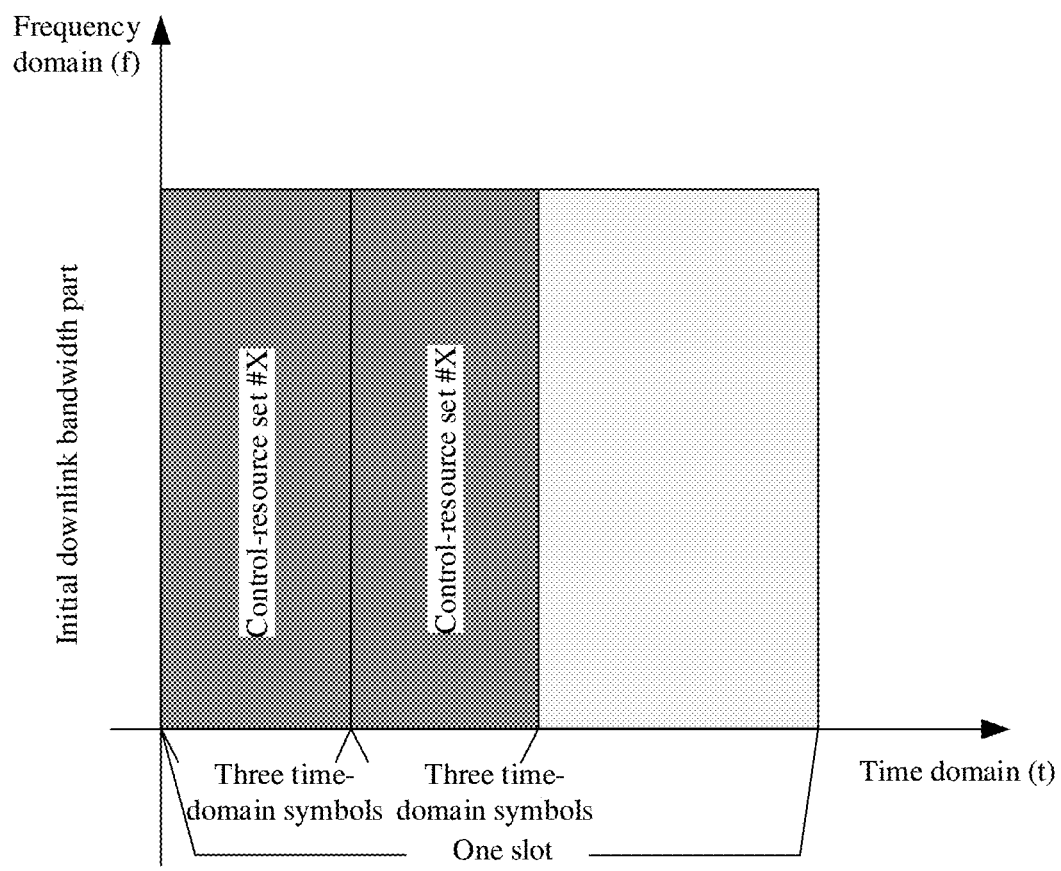
FIG. 7 is a schematic diagram of an application scenario of a method for enhancing a physical downlink control channel according to an embodiment of this application.

For example, as shown in FIG. 7, a case in which a CORESET is repeated exists, a time-domain resource of each CORESET includes three time-domain symbols, and the time-domain resource of the repeated CORESET includes six time-domain symbols, that is, a total number of time-domain symbols of the repeated CORESET is 6. Further, because 6 is greater than 3, the terminal device may determine that the second PDSCH time-domain resource configuration set is the target PDSCH time-domain resource configuration set. For example, refer to the second PDSCH time-domain resource allocation table shown in Table 4 in the foregoing embodiment. Therefore, the PDSCH time-domain resource allocation information is determined based on the second PDSCH time-domain resource configuration set.

In an application scenario, the PDSCH time-domain resource configuration set provided in this embodiment of this application may be used for scheduling and transmission of the SIB1, and may also be used for system information (SI), paging (paging), msg2/msgB/msg4 in a random access procedure, PDSCH transmission scheduled with DCI scrambled by a cell-radio network temporary identification (C-RNTI) or a configured scheduled-radio network temporary identification (configured scheduled-radio network temporary identification, CS-RNTI) or a modulation and coding scheme-cell-radio network temporary identification. (MCS-C-RNTI) transmitted in any common search space (CSS) associated with CORESET #0A, and PDSCH transmission scheduled with DCI scrambled by C-RNTI/CS-RNTI/MCS-C-RNTI transmitted in any CSS not associated with CORESET #0A or UE-specific search space (UE-specific search space, USS).

It can be learned that by implementing the method for enhancing a physical downlink control channel described in FIG. 5, the terminal device may configure the time-domain resource and the frequency-domain resource of the CORESET0 based on the CORESET0 configuration information sent by the network device. The number of time-domain symbols included in the time-domain resource of the CORESET0 may be greater than 3. In other words, the terminal device may provide more control channel elements by increasing the number of time-domain symbols of the CORESET0, thereby enhancing transmission performance of the physical downlink control channel. In addition, the terminal device may determine the time-domain resource configuration information of the physical downlink shared channel based on the number of time-domain symbols of the CORESET0, thereby ensuring flexibility of time-domain resource allocation of the physical downlink shared channel, and ensuring transmission performance of the SIB1.

It should be noted that in a specific implementation, some steps in the drawings can be selected for implementation, and an order of the steps in the illustrations can also be adjusted for implementation, which is not limited in this application. It should be understood that performing some steps in the figure or adjusting a sequence of the steps for specific implementation falls within the protection scope of this application.

Figure 8:
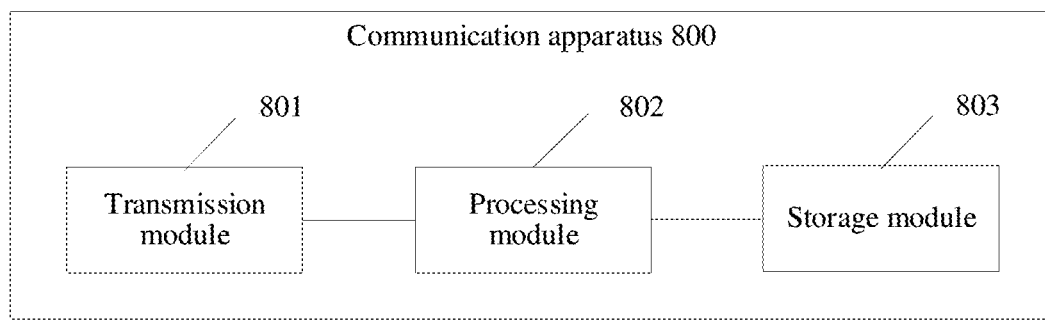
FIG. 8 is a schematic structural diagram of a communication apparatus according to an embodiment of this application.

FIG. 8 is a schematic structural diagram of a communication apparatus according to an embodiment of this application. The communication apparatus shown in FIG. 8 may be configured to implement some or all functions of the terminal device in the embodiment corresponding to the foregoing method for enhancing a physical downlink control channel. The communication apparatus shown in FIG. 8 may be configured to implement some or all functions of the terminal device in the method embodiment described in FIG. 3 or FIG. 5. The apparatus may be a terminal device, an apparatus in a terminal device, or an apparatus that can be used together with a terminal device. The communication apparatus may further be a chip system. The communication apparatus shown in FIG. 8 may include a transmission module 801 and a processing module 802.

The transmission module 801 is configured for the terminal device to obtain control-resource set CORESET configuration information, and the CORESET configuration information is used for configuring a time-domain resource and a frequency-domain resource of a CORESET. The time-domain resource includes X time-domain symbols, the X time-domain symbols are consecutive in time domain, X is an integer greater than or equal to 1 and less than or equal to M, and M is an integer greater than or equal to 4.

The processing module 802 is configured for the terminal device to determine a physical downlink shared channel PDSCH time-domain resource configuration set based on the X time-domain symbols, where the PDSCH time-domain resource configuration set is for PDSCH time-domain resource allocation.

In a possible implementation, the physical downlink shared channel PDSCH time-domain resource configuration set is a PDSCH time-domain resource configuration table or a PDSCH time-domain resource matrix.

In a possible implementation, when the X time-domain symbols are less than or equal to 3 in number, the processing module 802 is further configured to determine a first PDSCH time-domain resource configuration set, where the first PDSCH time-domain resource configuration set includes a mapping type of a PDSCH time-domain resource, and the mapping type includes a mapping type A and a mapping type B.

In a possible implementation, when X time-domain symbols are greater than 3 in number, the processing module 802 is further configured to determine a second PDSCH time-domain resource configuration set, where the second PDSCH time-domain resource configuration set includes at least one group of PDSCH time-domain resource allocation information, the PDSCH time-domain resource allocation information includes a mapping type of a PDSCH time-domain resource, a PDSCH time-domain start symbol, and a PDSCH time-domain length, and each group of PDSCH time-domain resource configuration information in the at least one group of PDSCH time-domain resource allocation information corresponds to row indication information.

In a possible implementation, the processing module 802 is further configured to determine target PDSCH time-domain resource allocation information from the second PDSCH time-domain resource configuration set based on the row indication information.

In a possible implementation, the processing module 802 is further configured to determine target PDSCH time-domain resource allocation information from a second PDSCH time-domain resource configuration set based on the row indication information and position information of a demodulation reference signal DMRS in the PDSCH time-domain resource mapping type A, where the target PDSCH time-domain resource allocation information includes a mapping type of a PDSCH time-domain resource, a PDSCH time-domain start symbol, and a PDSCH time-domain length.

In a possible implementation, the processing module 802 is specifically configured to determine target PDSCH time-domain resource configuration information from the second PDSCH time-domain resource configuration set based on a time-domain resource allocation indication field in downlink control information DCI carried on a PDCCH and/or position information of a DMRS of a PDSCH time-domain resource classification mapping type A sent by a network device. A mapping relationship exists between an indication status of the time-domain resource allocation indication field in the DCI and the row indication information.

In a possible implementation, the CORESET configuration information is CORESET0 configuration information, and the processing module 802 is further configured to determine a frequency-domain resource of a downlink initial bandwidth part BWP based on a frequency-domain resource of a CORESET0.

In the foregoing embodiments provided in this application, the methods provided in embodiments of this application are separately described from the perspective of the network device, the terminal device, and interaction between the network device and the terminal device. To implement the functions in the methods provided in the embodiments of this application, the network device and the terminal device may include a hardware structure and/or a software module, to implement the foregoing functions in the form of the hardware structure, the software module, or a combination of the hardware structure and the software module. Whether one of the foregoing functions is performed in the manner of a hardware structure, a software module, or a hardware structure and a software module depends on a specific application and design constraints of the technical solutions.

Figure 9:
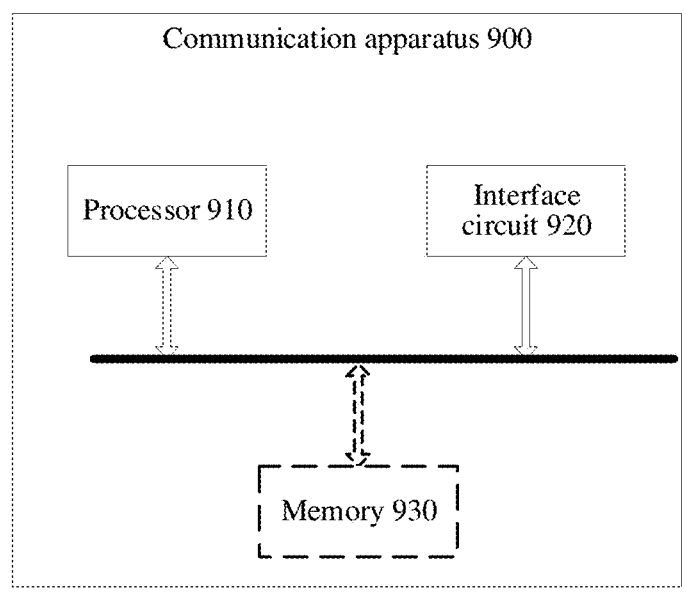
FIG. 9 is a schematic structural diagram of another communication apparatus according to an embodiment of this application.

FIG. 8 and FIG. 9 are schematic structural diagrams of possible communication apparatuses according to embodiments of this application. The communication apparatuses may implement the functions of the terminal device or the network device in the foregoing method embodiments. Therefore, beneficial effects of the foregoing method embodiments can also be implemented. In the embodiments of this application, the communication apparatus may be the terminal device shown in FIG. 3 and FIG. 5, or may be the network device shown in FIG. 3 and FIG. 5, or may be a module (such as a chip) applied to the terminal device or the network device.

As shown in FIG. 8, the communication apparatus 800 includes a transmission module 801, a processing module 802, and a storage module 803. The communication apparatus 800 may be configured to implement functions of the terminal device or the network device in the method embodiment shown in FIG. 3 or FIG. 5.

When the communication apparatus 800 is configured to implement a function of the terminal device in the method embodiment in FIG. 3, the transmission module 801 is configured to obtain control-resource set CORESET configuration information, where the CORESET configuration information is used for configuring a time-domain resource and a frequency-domain resource of a CORESET, and the time-domain resource includes X time-domain symbols. X time-domain symbols are consecutive in time domain, X is an integer greater than or equal to 1 and less than or equal to M, and M is an integer greater than or equal to 4; and the processing module 802 is configured to determine a physical downlink shared channel PDSCH time-domain resource configuration set based on the X time-domain symbols, where the PDSCH time-domain resource configuration set is for PDSCH time-domain resource allocation.

When the communication apparatus 800 is configured to implement a function of the network device in the method embodiment in FIG. 3, the storage module 803 is configured to store a program and an instruction. The transmission module 801 is configured to send control-resource set CORESET configuration information, and the CORESET configuration information is used for configuring a time-domain resource and a frequency-domain resource of a CORESET. The time-domain resource includes X time-domain symbols, the X time-domain symbols are consecutive in time domain, X is an integer greater than or equal to 1 and less than or equal to M, and M is an integer greater than or equal to 4; and the transmission module 801 is further configured to communicate with the terminal device by using a resource configured based on the CORESET configuration information.

When the communication apparatus 800 is configured to implement a function of the terminal device in the method embodiment in FIG. 5, the transmission module 801 is configured for the terminal device to obtain control-resource set CORESET0 configuration information, where the CORESET0 configuration information is used for configuring a time-domain resource and a frequency-domain resource of a CORESET0. The time-domain resource includes X time-domain symbols, the X time-domain symbols are consecutive in time domain, X is an integer greater than or equal to 1 and less than or equal to M, and M is an integer greater than or equal to 4; the processing module 802 is configured to determine a PDSCH time-domain resource configuration set based on the X time-domain symbols of the CORESET0 time-domain resource, where the PDSCH time-domain resource configuration set is for PDSCH time-domain resource allocation; and the processing module 802 is configured for the terminal device to determine a frequency-domain resource of a downlink initial bandwidth part (BWP) based on the frequency-domain resource of the CORESET0.

When the communication apparatus 800 is configured to implement a function of the network device in the method embodiment in FIG. 5, the storage module 803 is configured to store a program and an instruction. The transmission module 801 is configured to send control-resource set CORESET0 configuration information, and the CORESET0 configuration information is used for configuring a time-domain resource and a frequency-domain resource of a CORESET0. The time-domain resource includes X time-domain symbols, the X time-domain symbols are consecutive in time domain, X is an integer greater than or equal to 1 and less than or equal to M, and M is an integer greater than or equal to 4; and the transmission module 801 is further configured to communicate with the terminal device by using a resource configured based on the CORESET0 configuration information.

For more detailed descriptions of the transmission module 801, the processing module 802, and the storage module 803, refer to related descriptions in the foregoing method embodiment. Details are not described herein again.

As shown in FIG. 9, a communication apparatus 900 includes a processor 910 and an interface circuit 920. The processor 910 and the interface circuit 920 are coupled to each other. It may be understood that the interface circuit 920 may be a transceiver or an input/output interface. Optionally, the communication apparatus 900 may further include a memory 930, configured to store an instruction executed by the processor 910, or store input data required by the processor 910 to run the instruction, or store data generated after the processor 910 runs the instruction.

When the communication apparatus 900 is configured to implement the method in the foregoing method embodiment, the processor 910 is configured to perform a function of the processing module 802, the interface circuit 920 is configured to perform a function of the transmission module 801, and the memory 930 is configured to perform a function of the storage module 803.

When the communication apparatus is a chip applied to a terminal device, the chip in the terminal device implements functions of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip applied to a network device, the chip in the network device implements functions of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

It may be understood that the processor in the embodiments of this application may be a central processing unit (CPU), or may be another general purpose processor, a digital signal processor (DSP), an application-specific integrated circuit (ASIC), a field programmable gate array (FPGA), or another programmable logic device, a transistor logic device, a hardware component, or any combination thereof. The general purpose processor may be a microprocessor or any regular processor.

The method steps in embodiments of this application may be implemented in a hardware manner, or may be implemented in a manner of executing software instructions by the processor. The software instruction may include a corresponding software module. The software module may be stored in a random access memory (RAM), a flash memory, a read-only memory (ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or a storage medium of any other form well-known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be located in an access network device or the terminal device. Certainly, the processor and the storage medium may exist in the access network device or the terminal device as discrete components.

All or some of the foregoing embodiments may be implemented by using software, hardware, firmware, or any combination thereof. When software is used to implement the embodiments, all or a part of the embodiments may be implemented in the form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, or other programmable apparatuses. The computer programs or the instructions may be stored in a computer-readable storage medium, or may be transmitted by using a computer-readable storage medium. The computer-readable storage medium may be any usable medium accessible by the computer, or a data storage device such as a server integrating one or more usable media. The usable medium may be a magnetic medium, for example, a floppy disk, a hard disk, or a magnetic tape; may further be an optical medium, for example, a DVD; or may further be a semiconductor medium, for example, a solid state disk (SSD).

In the embodiments of this application, unless otherwise specified and there is a logical conflict, terms and/or descriptions in different embodiments are consistent and may be referenced by each other. Technical features in different embodiments may be combined based on an internal logical relationship thereof to form a new embodiment.

In this application, at least one means one or more, and a plurality of means two or more. The term "and/or" describes an association relationship for describing associated objects and represents that three relationships may exist. For example, A and/or B may represent the following three cases: only A exists, both A and B exist, and only B exists, where A and B may be singular or plural. In the text description of this application, the character "/" generally indicates an "or" relationship between the associated objects. In the formula of this application, the character "/" indicates a "division" relationship between the associated objects.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

An embodiment of this application further provides a computer-readable storage medium. The computer-readable storage medium stores computer-executable instructions. When the computer-executable instructions are executed, the method performed by the terminal device in the foregoing method embodiments is implemented.

An embodiment of this application further provides a computer-readable storage medium. The computer-readable storage medium stores computer-executable instructions. When the computer-executable instructions are executed, the method performed by the terminal device in the foregoing method embodiments is implemented.

An embodiment of this application further provides a computer program product. The computer program product includes a computer program. When the computer program is executed, the method performed by the terminal device in the foregoing method embodiments is implemented.

An embodiment of this application further provides a computer program product. The computer program product includes a computer program. When the computer program is executed, the method performed by the network device in the foregoing method embodiments is implemented.

An embodiment of this application further provides a communication system, and the communication system includes a terminal device or a network device. The terminal device is configured to perform the method performed by the terminal device in the foregoing method embodiments. The network device is configured to perform the method performed by the network device in the foregoing method embodiments.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that embodiments described in this specification are example embodiments, and the involved actions and modules are not necessarily required by this application.

Cross-reference may be made to descriptions of embodiments provided in this application, and the descriptions of embodiments have different focuses. For a part not described in detail in an embodiment, refer to related descriptions of another embodiment. For ease and brevity of description, for example, for functions and performed steps of the apparatuses and devices provided in embodiments of this application, refer to related descriptions of the method embodiments of this application. The method embodiments and the apparatus embodiments may also be referenced, combined, or cited to each other.

Finally, it should be noted that the foregoing embodiments are merely intended for describing the technical solutions of this application other than limiting this application. Although this application is described in detail with reference to the foregoing embodiments, a person of ordinary skill in the art should understand that modifications may still be made to the technical solutions described in the foregoing embodiments or equivalent replacements may be made to some or all technical features thereof, without departing from the scope of the technical solutions of embodiments of this application.

What is claimed is:

1. A method for enhancing a physical downlink control channel, the method comprising:

obtaining, by a terminal device, control-resource set (CORESET) configuration information, wherein the CORESET configuration information is used for configuring a time-domain resource and a frequency-domain resource of a CORESET, wherein the time-domain resource comprises X time-domain symbols, wherein the X time-domain symbols are consecutive in time domain, wherein X is an integer greater than or equal to 1 and less than or equal to M, and wherein M is an integer greater than or equal to 4; and determining, by the terminal device, a physical downlink shared channel (PDSCH) time-domain resource configuration set based on the X time-domain symbols, wherein the PDSCH time-domain resource configuration set is for PDSCH time-domain resource allocation, and wherein determining, by the terminal device, the PDSCH time-domain resource configuration set based on the X time-domain symbols comprises:

determining, by the terminal device, a second PDSCH time-domain resource configuration set when the X time-domain symbols are greater than 3 in number, wherein the second PDSCH time-domain resource configuration set comprises at least one group of PDSCH time-domain resource allocation information, wherein the PDSCH time-domain resource allocation information comprises a mapping type of a PDSCH time-domain resource, a PDSCH time-domain start symbol, and a PDSCH time-domain length, and wherein each group of PDSCH time-domain resource configuration information in the at least one group of PDSCH time-domain resource allocation information corresponds to row indication information.

2. The method according to claim 1, wherein the second PDSCH time-domain resource configuration set is a PDSCH time-domain resource configuration table.

3. The method according to claim 1, wherein determining, by the terminal device, the PDSCH time-domain resource configuration set based on the X time-domain symbols further comprises determining, by the terminal device, a first PDSCH time-domain resource configuration set when the X time-domain symbols are less than or equal to 3 in number, wherein the first PDSCH time-domain resource configuration set comprises a mapping type of a PDSCH time-domain resource, and the mapping type comprises a mapping type A and a mapping type B.

4. The method according to claim 1, further comprising: when the X time-domain symbols are greater than 3 in number, determining, by the terminal device, target PDSCH time-domain resource allocation information from the second PDSCH time-domain resource configuration set based on the row indication information.

5. The method according to claim 1, further comprising: when the X time-domain symbols are greater than 3 in number, determining, by the terminal device, target PDSCH time-domain resource allocation information from the second PDSCH time-domain resource configuration set based on the row indication information and position information of a demodulation reference signal (DMRS) of PDSCH time-domain resource mapping type A, wherein the target PDSCH time-domain resource allocation information comprises a mapping type of a PDSCH time-domain resource, a PDSCH time-domain start symbol, and a PDSCH time-domain length.

6. The method according to claim 1, wherein determining, by the terminal device, the PDSCH time-domain resource configuration information based on the second PDSCH time-domain resource configuration set comprises:
when the X time-domain symbols are greater than 3 in number, determining, by the terminal device, target PDSCH time-domain resource configuration information from the second PDSCH time-domain resource configuration set based on a time-domain resource allocation indication field in downlink control information (DCI) carried on a PDCCH and/or position information of a demodulation reference signal (DMRS) of PDSCH time-domain resource classification mapping type A sent by a network device, and wherein a mapping relationship exists between an indication status of the time-domain resource allocation indication field in the DCI and the row indication information.

7. The method according to claim 1, wherein the CORESET configuration information is CORESET0 configuration information, and wherein the method further comprises determining, by the terminal device, a frequency-domain resource of a downlink initial bandwidth part (BWP) based on a frequency-domain resource of a CORESET0.

8. The method according to claim 1, wherein obtaining, by the terminal device, the CORESET configuration information comprises:
receiving, by the terminal device, a master information block (MIB) from a network device by using a physical broadcast channel (PBCH), wherein the MIB comprises configuration information of a system information block 1, and the configuration information of the system information block 1 indicates the CORESET configuration information; or
receiving, by the terminal device, an MIB from a network device by using a PBCH, wherein an idle bit in the MIB indicates the CORESET configuration information; or
receiving, by the terminal device, a newly added timing bit from a network device by using a PBCH, wherein the newly added timing bit indicates the CORESET configuration information; or
receiving, by the terminal device, an MIB and a newly added timing bit from a network device by using a PBCH, wherein the MIB and the newly added timing bit indicate the CORESET configuration information; or
receiving, by the terminal device, indication information from a network device, wherein the indication information indicates the CORESET configuration information, and the indication information comprises one or more of a system information block 1, radio resource control signaling, media access signaling, and downlink control information.

9. The method according to claim 1, wherein the second PDSCH time-domain resource configuration set is a PDSCH time-domain resource matrix.

10. A method for enhancing a physical downlink control channel, the method comprising:
sending, by a network device, control-resource set (CORESET) configuration information to a terminal device, wherein the CORESET configuration information is used for configuring a time-domain resource and a frequency-domain resource of a CORESET, wherein the time-domain resource comprises X time-domain symbols, wherein the X time-domain symbols are consecutive in time domain, wherein X is an integer greater than or equal to 1 and less than or equal to M, and wherein M is an integer greater than or equal to 4; and
communicating, by the network device, with the terminal device by using a resource configured based on the CORESET configuration information;
wherein sending, by the network device, the CORESET configuration information to the terminal device comprises:
sending, by the network device, a master information block (MIB) to the terminal device by using a physical broadcast channel (PBCH), wherein the MIB comprises configuration information of a system information block 1, and wherein the configuration information of the system information block 1 indicates the CORESET configuration information; or
sending, by the network device, an MIB to the terminal device by using a PBCH, wherein an idle bit in the MIB indicates the CORESET configuration information; or
sending, by the network device, a newly added timing bit to the terminal device by using a PBCH, wherein the newly added timing bit indicates the CORESET configuration information; or
sending, by the network device, an MIB and a newly added timing bit to the terminal device by using a PBCH, wherein the MIB and the newly added timing bit indicate the CORESET configuration information; or
sending, by the network device, indication information to the terminal device, wherein the indication information indicates the CORESET configuration information, and the indication information comprises one or more of a system information block 1, radio resource control signaling, media access signaling, and downlink control information.

11. The method according to claim 10, wherein the CORESET configuration information is CORESET0 configuration information, and wherein a frequency-domain resource of a downlink initial bandwidth part (BWP) is determined based on a frequency-domain resource of a CORESET0.

12. An apparatus comprising:
a transmitter configured to obtain control-resource set (CORESET) configuration information, wherein the CORESET configuration information is used for configuring a time-domain resource and a frequency-domain resource of a CORESET, wherein the time-domain resource comprises X time-domain symbols, wherein the X time-domain symbols are consecutive in time domain, wherein X is an integer greater than or equal to 1 and less than or equal to M, and wherein M is an integer greater than or equal to 4; and
at least one processor configured to determine a physical downlink shared channel (PDSCH) time-domain resource configuration set based on the X time-domain symbols, wherein the PDSCH time-domain resource configuration set is for PDSCH time-domain resource allocation, and wherein determining the PDSCH time-domain resource configuration set based on the X time-domain symbols comprises:
determining a second PDSCH time-domain resource configuration set when the X time-domain symbols are greater than 3 in number, wherein the second PDSCH time-domain resource configuration set comprises at least one group of PDSCH time-domain resource allocation information, wherein the PDSCH time-domain resource allocation information comprises a mapping type of a PDSCH time-domain resource, a PDSCH time-domain start symbol, and a PDSCH time-domain length, and wherein each group of PDSCH time-domain resource configuration information in the at least one group of PDSCH time-domain resource allocation information corresponds to row indication information.

13. The apparatus according to claim 12, wherein the second PDSCH time-domain resource configuration set is a PDSCH time-domain resource configuration table.

14. The apparatus according to claim 12, wherein the at least one processor is further configured to determine the PDSCH time-domain resource configuration set based on the X time-domain symbols by determining a first PDSCH time-domain resource configuration set when the X time-domain symbols are less than or equal to 3 in number, wherein the first PDSCH time-domain resource configuration set comprises a mapping type of a PDSCH time-domain resource, and wherein the mapping type comprises a mapping type A and a mapping type B.

15. The apparatus according to claim 12, wherein the at least one processor is further configured to:
when the X time-domain symbols are greater than 3 in number, determine target PDSCH time-domain resource allocation information from the second PDSCH time-domain resource configuration set based on the row indication information.

16. The apparatus according to claim 12, wherein the at least one processor is further configured to:
when the X time-domain symbols are greater than 3 in number, determine target PDSCH time-domain resource allocation information from the second PDSCH time-domain resource configuration set based on the row indication information and position information of a demodulation reference signal (DMRS) of PDSCH time-domain resource mapping type A, and wherein the target PDSCH time-domain resource allocation information comprises a mapping type of a PDSCH time-domain resource, a PDSCH time-domain start symbol, and a PDSCH time-domain length.

17. The apparatus according to claim 12, wherein the at least one processor is configured to:
when the X time-domain symbols are greater than 3 in number, determine the PDSCH time-domain resource configuration information based on the second PDSCH time-domain resource configuration set by determining target PDSCH time-domain resource configuration information from the second PDSCH time-domain resource configuration set based on a time-domain resource allocation indication field in downlink control information (DCI) carried on a PDCCH and/or position information of a demodulation reference signal (DMRS) of PDSCH time-domain resource classification mapping type A sent by a network device, and wherein a mapping relationship exists between an indication status of the time-domain resource allocation indication field in the DCI and the row indication information.

18. The apparatus according to claim 12, wherein the second PDSCH time-domain resource configuration set is a PDSCH time-domain resource matrix.

19. A apparatus comprising:
a storage module configured to store a program and instructions; and
a transmitter configured to send control-resource set (CORESET) configuration information, wherein the CORESET configuration information is used for configuring a time-domain resource and a frequency-domain resource of a CORESET, wherein the time-domain resource comprises X time-domain symbols, wherein the X time-domain symbols are consecutive in time domain, wherein X is an integer greater than or equal to 1 and less than or equal to M, wherein M is an integer greater than or equal to 4, and wherein the transmitter is configured to communicate with a terminal device by using a resource configured based on the CORESET configuration information;
wherein sending the CORESET configuration information comprises:
sending a master information block (MIB) by using a physical broadcast channel (PBCH), wherein the MIB comprises configuration information of a system information block 1, and the configuration information of the system information block 1 indicates the CORESET configuration information; or
sending an MIB by using a PBCH, wherein an idle bit in the MIB indicates the CORESET configuration information; or
sending a newly added timing bit by using a PBCH, wherein the newly added timing bit indicates the CORESET configuration information; or
sending an MIB and a newly added timing bit by using a PBCH, wherein the MIB and the newly added timing bit indicate the CORESET configuration information; or
sending indication information, wherein the indication information indicates the CORESET configuration information, and the indication information comprises one or more of a system information block 1, radio resource control signaling, media access signaling, and downlink control information.

20. The apparatus according to claim 19, wherein the CORESET configuration information is CORESET0 configuration information, and wherein a frequency-domain resource of a downlink initial bandwidth part (BWP) is determined based on a frequency-domain resource of a CORESET0.

* * * * *